(12) United States Patent
Yamauchi et al.

(10) Patent No.: US 7,472,995 B2
(45) Date of Patent: Jan. 6, 2009

(54) WAVELENGTH-SELECTIVE POLARIZATION CONVERSION ELEMENT, PROJECTION DISPLAYING OPTICAL SYSTEM AND IMAGE PROJECTION APPARATUS

(75) Inventors: Yu Yamauchi, Utsunomiya (JP); Atsushi Okuyama, Tokorozawa (JP); Reona Ushigome, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 11/531,148

(22) Filed: Sep. 12, 2006

(65) Prior Publication Data
US 2007/0071043 A1   Mar. 29, 2007

(30) Foreign Application Priority Data
Sep. 13, 2005   (JP) .............................. 2005-266051

(51) Int. Cl.
| G03B 21/14 | (2006.01) |
| G02B 1/10 | (2006.01) |
| G02B 5/30 | (2006.01) |
| G02B 27/02 | (2006.01) |
| G02B 27/14 | (2006.01) |
| G02B 27/12 | (2006.01) |

(52) U.S. Cl. .................... 353/20; 359/583; 359/437; 359/629; 359/639; 362/19

(58) Field of Classification Search ............... 353/20; 359/583, 437, 629, 639; 362/19
See application file for complete search history.

(56) References Cited

U.S. PATENT DOCUMENTS

| 5,748,369 | A  | * | 5/1998 | Yokota ....................... 359/487 |
| 6,347,014 | B1 |   | 2/2002 | Hayashi et al. |
| 6,742,897 | B1 | * | 6/2004 | Tajiri ........................... 353/20 |
| 2003/0064879 | A1 | * | 4/2003 | Ogino et al. .................. 501/75 |

FOREIGN PATENT DOCUMENTS

| JP | 11-153774 | 6/1999 |
| JP | 2000-19455 | 1/2000 |
| JP | 2001-154152 | 6/2001 |

* cited by examiner

*Primary Examiner*—Diane I Lee
*Assistant Examiner*—Magda Cruz
(74) *Attorney, Agent, or Firm*—Morgan & Finnegan, LLP

(57) ABSTRACT

A wavelength-selective polarization conversion element is disclosed, which is capable of reducing the number of optical elements in an optical system and simplifying the configuration thereof. The polarization conversion element comprises a beam splitting film which splits light by transmission and reflection and has a characteristic in which at least its transmittance for light with a first polarization direction changes between a transmittance higher than 50% and a transmittance lower than 50% depending on wavelength regions, and a phase plate which converts the polarization direction of light from the beam splitting film between the first polarization direction and a second polarization direction. The polarization conversion element converts light of two of first, second and third wavelength regions into light with one of the first and second polarization directions and converts light of the remaining wavelength region into light with the other polarization direction.

14 Claims, 15 Drawing Sheets

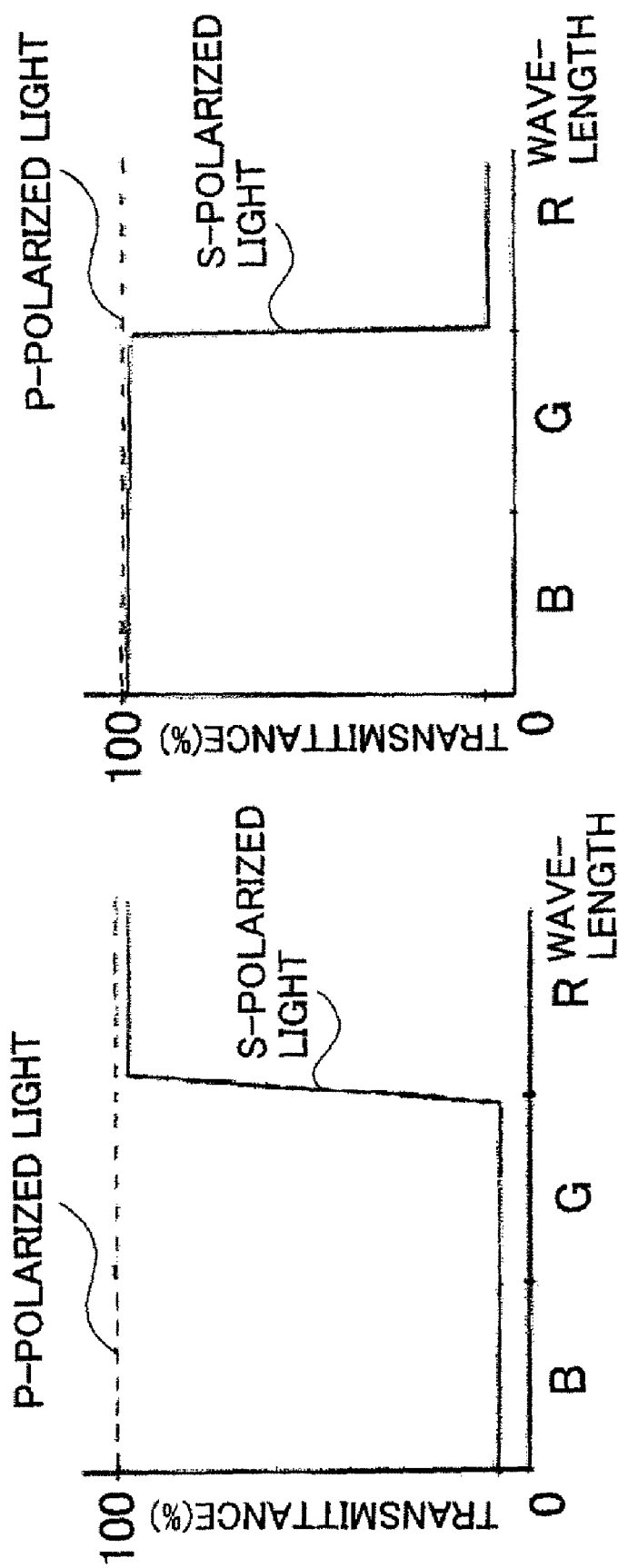

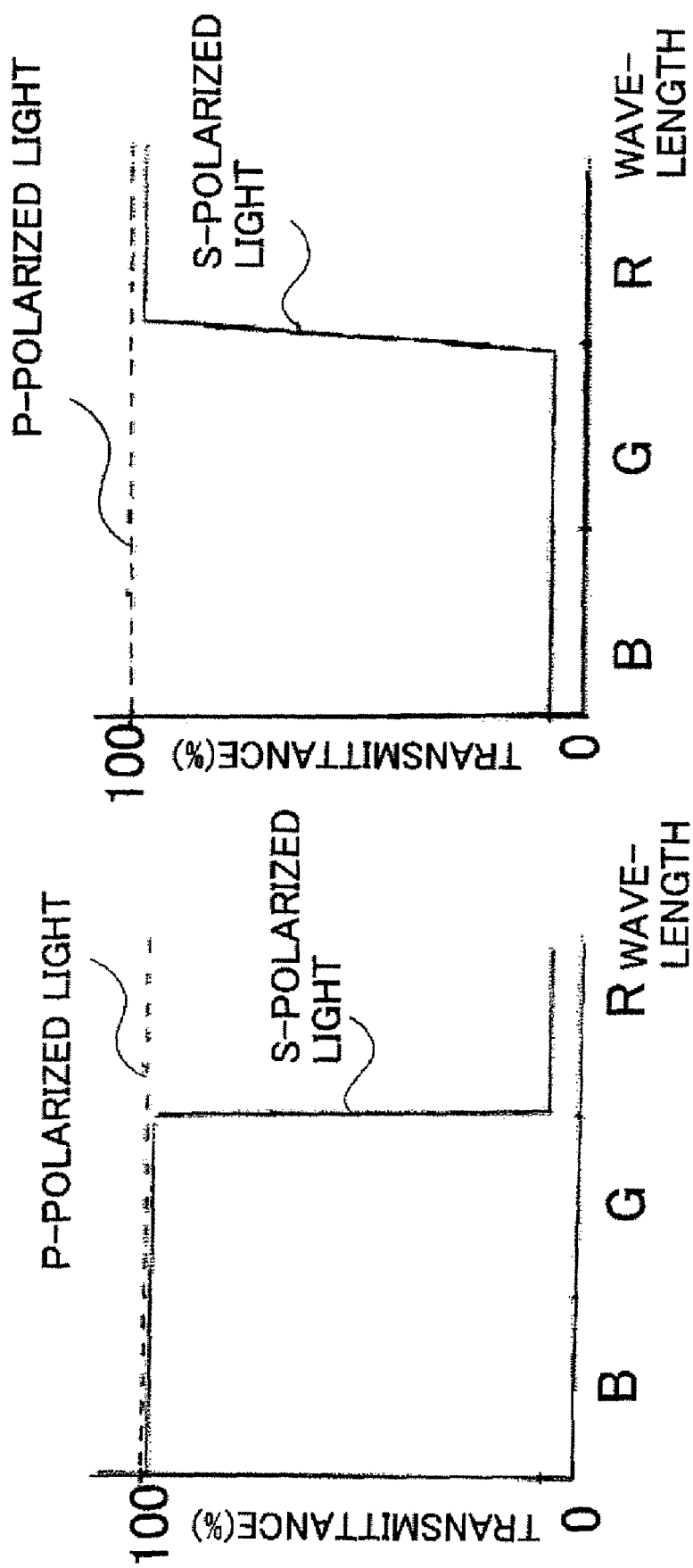

FILM CONFIGURATION

| | 32 | 34 |
|---|---|---|
| GLASS | PBH56 | PBH56 |
| 1 | 208.53H | 213.57M |
| 2 | 53.96L | 96.66H |
| 3 | 77.5H | 197.2M |
| 4 | 33.21L | 80.64H |
| 5 | 65.16H | 223.3M |
| 6 | 115.14L | 45.88H |
| 7 | 40.28H | 231.79M |
| 8 | 143.82L | 103.53H |
| 9 | 40.05H | 19.65L |
| 10 | 143.39L | 142.36H |
| 11 | 32.47H | 22.84L |
| 12 | 19.82L | 27.06H |
| 13 | 193.21H | 22.67L |
| 14 | 65.06M | 266.39H |
| 15 | 104.51H | 26.69L |
| 16 | 57.47M | 158.66H |
| 17 | 213.3H | 38.31L |
| 18 | 255.08M | 137.67H |

| H | M | L |
|---|---|---|
| $TiO_2$ | $Al_2O_3$ | $SiO_2$ |

FIG. 18

WAVELENGTH-SELECTIVE POLARIZATION CONVERSION ELEMENT, PROJECTION DISPLAYING OPTICAL SYSTEM AND IMAGE PROJECTION APPARATUS

BACKGROUND OF THE INVENTION

The present invention relates to wavelength-selective polarization conversion elements which convert non-polarized light into light with a polarization direction according to a wavelength region (or color) and image projection apparatuses equipped with the element, such as liquid crystal projectors.

Japanese Patent Laid-Open Application Nos. 2001-154152 and 2000-19455 have disclosed image projection apparatuses which perform color-separation and color-combination by a polarization beam splitter. In the apparatuses, non-polarized light emitted from a light source is divided into plural luminous fluxes by a lens array, secondary light source images are formed by the divided luminous fluxes, and luminous fluxes from the secondary images of the light source are overlapped with each other on an image-forming element such as a liquid crystal panel, thereby illuminating the image-forming element with light with substantially even luminance.

Each divided luminous flux from the lens array enters a polarization conversion cell corresponding to each lens cell of the lens array, plural polarization conversion cells being provided in a polarization conversion element. Each polarization conversion cell has a polarization beam splitting film, a half-wave plate and a reflecting surface. The non-polarized light that entered the polarization conversion cell is separated into P-polarized light and S-polarized light by the polarization beam splitting film. The P-polarized light is transmitted through the polarization beam splitting film. The polarization direction of the P-polarized light is rotated by 90 degrees by the half-wave plate, and the resulting S-polarized light emerges from the polarization conversion element.

On the other hand, the S-polarized light is reflected by the polarization beam splitting film, and then reflected by the reflecting surface to emerge from the polarization conversion element. The S-polarized light with a uniformed polarization direction, which emerged from the polarization conversion element, enters a condenser lens.

The S-polarized light that emerged from the condenser lens is separated into light of first and second wavelength regions and light of a third wavelength region by a dichroic element. In this stage, the light of the first wavelength region and the light of the second wavelength region travel in the same optical path and have the same polarization direction. Then, the light of the first and second wavelength regions is passed through a wavelength (color)-selective phase plate. This is for introducing light of the first wavelength region and light of the second wavelength region to first and second image-forming elements, respectively, by a polarization beam splitter.

Thereby, it is possible to separate the light of the first and second wavelength regions into light components with different polarization directions.

The wavelength-selective phase plate is made by laminating a plurality of stretched films. It has a characteristic which converts only one of the light of the first wavelength region and the light of the second wavelength region into light with a polarization direction orthogonal to its original polarization direction and transmits the other one without changing its polarization direction.

As described above, image projection apparatuses which perform color-separation by using a polarization beam splitter generally include a polarization conversion element located near a lens array and a wavelength-selective phase plate located near the polarization beam splitter.

Japanese Patent Laid-Open Application Nos. 2000-19455 and H11(1999)-153774 have disclosed image projection apparatuses which use a particular optical element. The apparatus disclosed in Japanese Patent Laid-Open Application No. 2000-19455 uses an optical element constituted by a first dichroic layer transmitting light of a predetermined wavelength region and reflecting light of another wavelength region, a phase layer rotating the polarization plane of light transmitted through the first dichroic layer by 90 degrees and a total reflection layer totally reflecting light from the phase layer. The apparatus disclosed in Japanese Patent Laid-Open Application No. H11(1999)-153774 uses a polarization beam splitter having wavelength selectivity and performing polarizing, analyzing, color-separation and color-combination.

However, using the wavelength-selective phase plate separate from the polarization conversion element as disclosed in Japanese Patent Laid-Open Application No. 2001-154152 increases the number of optical elements constituting the image projection apparatus. In addition, the configuration becomes complex since holding and positioning of the wavelength-selective phase plate and a cooling structure for cooling the wavelength-selective phase plate made of a multilayer film are necessary.

BRIEF SUMMARY OF THE INVENTION

An object of the present invention is to provide a wavelength-selective polarization conversion element having a polarization conversion function which is similar to that obtained by a conventional polarization conversion element and a conventional wavelength-selective phase plate, and being capable of reducing the number of optical elements especially in a projection displaying optical system or an image projection apparatus and simplifying the configuration thereof.

According to one aspect, the present invention provides a wavelength-selective polarization conversion element which converts non-polarized light including light of a first wavelength region, light of a second wavelength region and light of a third wavelength region into polarized light. The element comprises a beam splitting film which splits light by transmission and reflection and has a characteristic in which at least its transmittance for light with a first polarization direction changes between a transmittance higher than 50% and a transmittance lower than 50% depending on wavelength regions, and a phase plate which converts the polarization direction of light from the beam splitting film between the first polarization direction and a second polarization direction orthogonal to the first polarization direction. The polarization conversion element converts light of two of the first, second and third wavelength regions into light with one of the first and second polarization directions and converts light of the remaining wavelength region into light with the other polarization direction.

According to another aspect, the present invention provides a projection displaying optical system, an image projection apparatus and an illumination optical system, which include the wavelength-selective polarization conversion element.

Other objects and features of the present invention will become apparent from the following description and the attached drawings.

BRIEF DESCRIPTION OF THE DRAWINGS

FIG. 3 is a diagram showing a characteristic of the first beam splitting film that constitutes the wavelength-selective polarization conversion element in Embodiment 1.

FIG. 4 is a diagram showing a characteristic of the second beam splitting film that constitutes the wavelength-selective polarization conversion element in Embodiment 1.

FIG. 7 is a diagram showing a characteristic of the first beam splitting film that constitutes the wavelength-selective polarization conversion element in Embodiment 2.

FIG. 8 is a diagram showing a characteristic of the second beam splitting film that constitutes the wavelength-selective polarization conversion element in Embodiment 2.

FIG. 18 is a diagram showing configuration examples of the first and second beam splitting films that constitute the wavelength-selective polarization conversion element in Embodiment 1.

DETAILED DESCRIPTION OF THE PREFERRED EMBODIMENTS

Preferred embodiments of the present invention will hereinafter be described with reference to the drawings.

Figure 1:
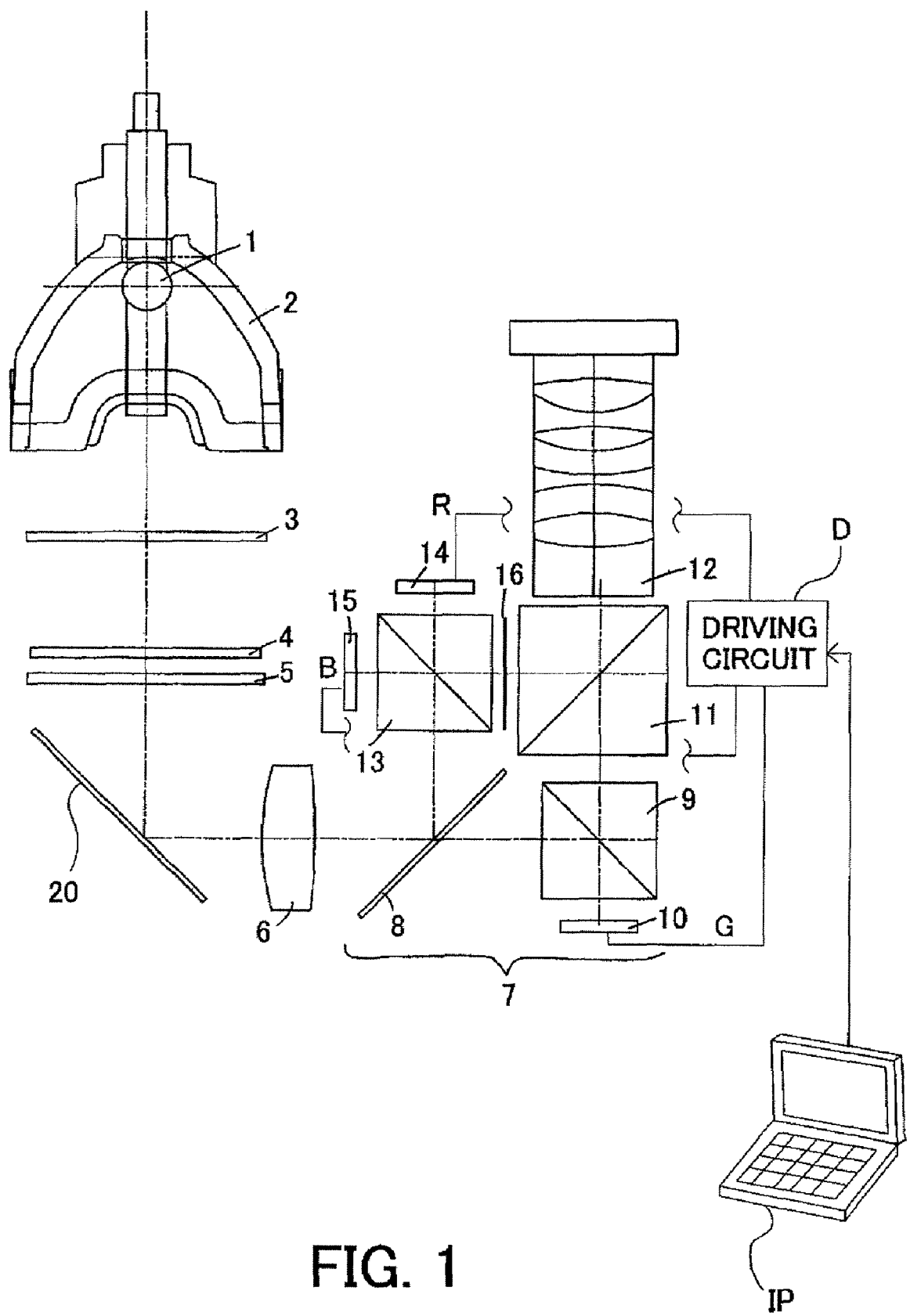
FIG. 1 is a figure showing the configuration of the projection displaying optical system that is Embodiment 1 of the present invention.

FIG. 1 shows a projection displaying optical system using a wavelength-selective polarization conversion element that is Embodiment 1 of the present invention.

A luminous flux emitted from a white light source 1 is converted into a parallel luminous flux by a parabolic reflector 2. The parallel luminous flux described herein includes not only a completely parallel luminous flux but also a slightly convergent or slightly divergent luminous flux that can be regarded as a parallel luminous flux in view of characteristics of the optical system. This also applies to the following embodiments.

The parallel luminous flux is divided into plural luminous fluxes by a first fly-eye lens 3, each luminous flux being collected. Each of the luminous fluxes is collected near a second fly-eye lens 4 and a wavelength-selective polarization conversion element 5 and forms an image of the light source (secondary light source image). Each of the fly-eye lenses 3 and 4 is a lens array constituted by a plurality of lens cells arranged two-dimensionally. Each lens cell has a rectangular shape similar to the shape of a liquid crystal panel (image-forming element), described later, which forms a plane to be illuminated.

The wavelength-selective polarization conversion element 5 converts light of blue (B) and green (G) wavelength regions of each divided luminous flux that emerged from the second fly-eye lens 4 into S-polarized light that is linearly polarized light with a first polarization direction. The B and G wavelength regions correspond to first and second wavelength regions, respectively. The wavelength-selective polarization conversion element 5 also converts light of red (R) wavelength region that corresponds to a third wavelength region into P-polarized light that is linearly polarized light with a second polarization direction.

The S-polarized light of the B and G wavelength regions and the P-polarized light of the R wavelength region that emerged from the wavelength-selective polarization conversion element 5 are reflected by a mirror 20. Then, the divided luminous fluxes are collected by a condenser lens 6, passed through a color-separating/combining optical system 7 and overlapped with each other to illuminate reflective liquid crystal panels 15, 10 and 14 for the B, G and R wavelength regions. An optical system from the light source 1 to at least the condenser lens 6 is an illumination optical system. This also applies to the following embodiments.

The color-separating/combining optical system 7 includes a dichroic mirror 8 which reflects the light of the B and R wavelength regions of the polarized light transmitted through the condenser lens 6 and transmits the light of the G wavelength region. The polarized light of the G wavelength region transmitted through the dichroic mirror 8 is reflected by a first polarization beam splitter 9 and enters the reflective liquid crystal panel 10 for the G wavelength region.

Each reflective liquid crystal panel is connected to a driving circuit D. The driving circuit D which constitutes part of a projector (image projection apparatus) is received an image signal from an image supply apparatus IP such as a personal computer, DVD player, VCR and television tuner. The driving circuit D drives the reflective liquid crystal panels for each color based on R, G and B components of the received image signal. Each reflective liquid crystal panel reflects and modulates each wavelength region light to cause it to emerge as image light. This configuration also applies to the following embodiments though not shown in the figure.

The image light (polarized light) from the reflective liquid crystal panel 10 for the G wavelength region (hereinafter, referred to as the G liquid crystal panel) is transmitted through the first polarization beam splitter 9, further transmitted through a second polarization beam splitter 11 and then projected onto a screen, not shown, by a projection lens 12.

On the other hand, the R wavelength region polarized light of the polarized light of the B and R wavelength regions reflected by the dichroic mirror 8 is transmitted through a third polarization beam splitter 13, and the B wavelength region polarized light is reflected by the third polarization beam splitter 13. The B wavelength region polarized light and the R wavelength region polarized light that emerged from the third polarization beam splitter 13 are collected on the reflective liquid crystal panels 15 and 14 for the B and R wavelength regions (hereinafter, referred to as the B and R liquid crystal panels), respectively.

The R wavelength region polarized light reflected and modulated by the R liquid crystal panel 14 is reflected by the third polarization beam splitter 13. The B wavelength region polarized light reflected and modulated by the B liquid crystal panel 15 is transmitted through the third polarization beam splitter 13. Then, only the polarization direction of the B wavelength region polarized light is rotated by 90 degrees by a wavelength-selective phase plate 16, thereby coinciding the polarization direction of the B wavelength region polarized light with that of the R wavelength region polarized light. The polarized light of the B and R wavelength regions is reflected by the second polarization beam splitter 11 and then projected on the screen by the projection lens 12.

Next, the structure and the optical function of the wavelength-selective polarization conversion element 5 will be described with reference to FIG. 2. On the right side in FIG. 2, the schematic structure of the wavelength-selective polarization conversion element 5 is shown.

The circled part in the figure shows one polarization conversion cell 5a, and a plurality of the polarization conversion cells 5a having the same structure are provided so that each of the cells 5a corresponds to each of the plurality of the lens cells of the fly-eye lenses 3 and 4. A light-shielding plate 5b is provided in an area from the position of a reflecting film, described later, to that of the above adjacent polarization conversion cells on the light-entering surface of each polarization conversion cells 5a to shield light entering this part. Thus, light enters the polarization conversion cells 5a only from an area between the position of the reflecting film and that of a first wavelength-selective polarization beam splitting film, described later, on the light-entering surface.

Figure 2:
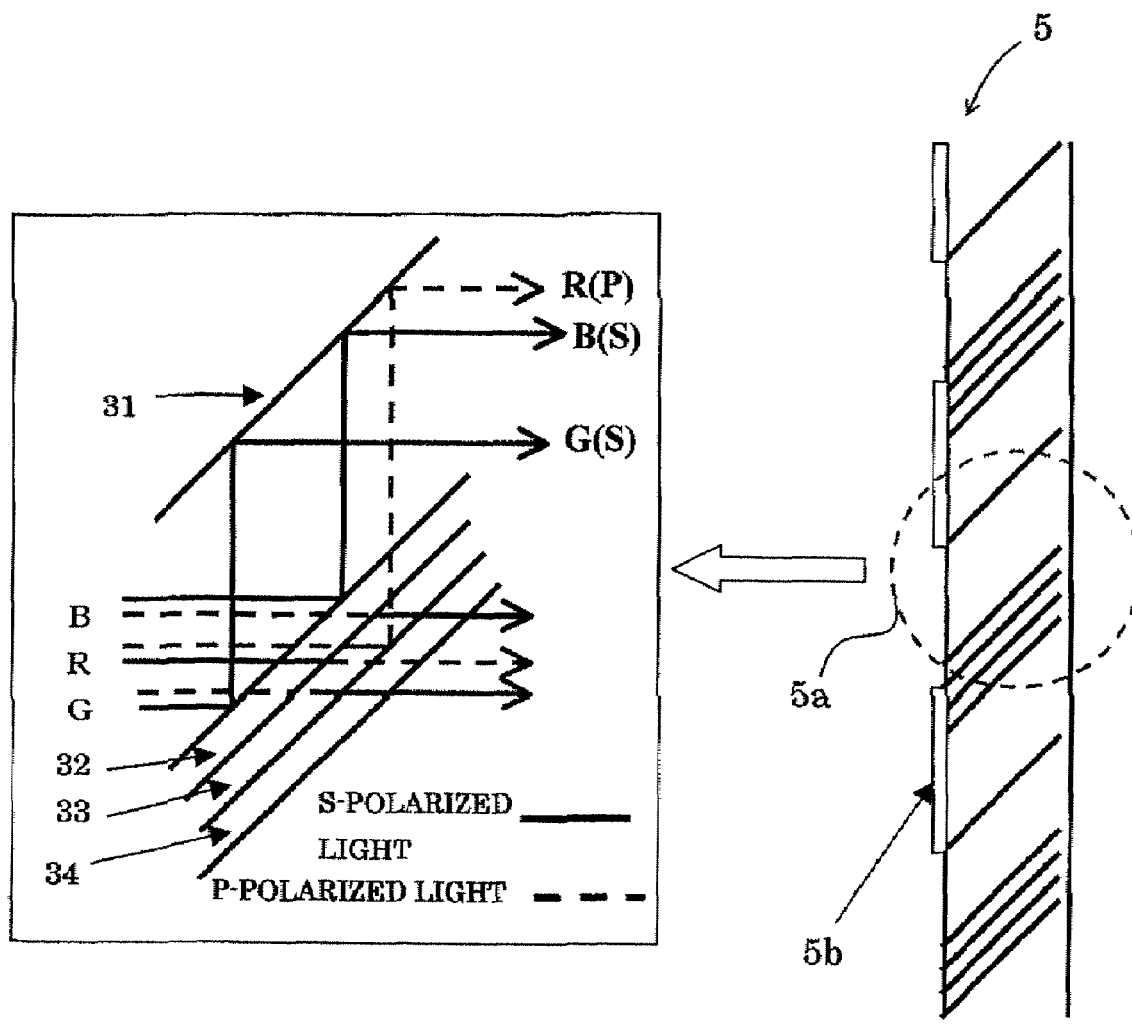
FIG. 2 is a schematic view showing the structure of the wavelength-selective polarization conversion element that is used in Embodiment 1.

On the left side in FIG. 2, an enlarged polarization conversion cell 5a is shown. 31 denotes the above-described reflecting film, which forms a reflecting surface. In order from the light-entering side, 32 denotes the above-described first wavelength-selective polarization beam splitting film (first beam splitting film), 33 a phase plate, and 34 a second wavelength-selective polarization beam splitting film (second beam splitting film). Hereinafter, the wavelength-selective polarization beam splitting film is abbreviated as the beam splitting film.

These first beam splitting film 32, phase plate 33 and second beam splitting film 34 form an angle of 45 degrees to an light-entering axis direction (a direction from the left side toward the right side in the figure). The reflecting film 31 is located parallel to the first beam splitting film 32. Each of the first and second beam splitting films 32 and 34 is actually formed as a multilayer film on a surface of a substrate such as a glass plate or an acrylic plate, which is a parallel plate. The phase plate 33 is formed like a film and attached on a similar substrate.

FIGS. 3 and 4 show characteristics of the first and second beam splitting films 32 and 34, respectively. The first beam splitting film 32 has a characteristic in which the transmittance for S-polarized light of the B and G wavelength regions is equal to or near 0% (in other words, lower than 50%, and preferably lower than 30%) and the transmittance for S-polarized light of the R wavelength region is equal to or near 100% (in other words, higher than 50%, and preferably higher than 70%).

On the other hand, the second beam splitting film 34 has a characteristic in which the transmittance for S-polarized polarized light of the B and G wavelength regions is equal to or near 100% (in other words, higher than 50%) and the transmittance for S-polarized light of the R wavelength region is equal to or near 0% (in other words, lower than 50%). As described above, the first and second beam splitting films 32 and 34 have characteristics in which their transmittances for S-polarized light are opposite to each other in each wavelength regions. In other words, a wavelength region in which the first beam splitting film has a transmittance higher than 50% for S-polarized light and a wavelength region in which the second beam splitting film has a transmittance higher than 50% for S-polarized light are different from each other. Further, a wavelength region in which the first beam splitting film has a transmittance lower than 50% for S-polarized light and a wavelength region in which the second beam splitting film has a transmittance lower than 50% for S-polarized light are different from each other.

In addition, the first and second beam splitting films 32 and 34 have characteristics in which the transmittance for P-polarized light is equal to or near 100% (in other words, higher than 50%) regardless of wavelength regions.

Further, the phase plate 33 is a half-wave plate and has a function to rotate the polarization direction of linearly polarized light by 90 degrees.

White non-polarized light enters the wavelength-selective polarization conversion element 5 constructed as above from the left side in FIG. 2. Of the non-polarized light, P-polarized light of the B and G wavelength regions is transmitted through the first beam splitting film 32, converted into S-polarized light by being transmitted through the phase plate 33, transmitted through the second beam splitting film 34, and then emerges from the wavelength-selective polarization conversion element 5 as S-polarized light.

S-polarized light of the B and G wavelength regions is reflected by the first beam splitting film 32, reflected by the reflecting film 31, and then emerges from the wavelength-selective polarization conversion element 5 as S-polarized light.

P-polarized light of the R wavelength region is transmitted through the first beam splitting film 32, converted into S-polarized light by being transmitted through the phase plate 33, and then reflected by the second beam splitting film 34. The reflected light is converted into P-polarized light by being transmitted through the phase plate 33 again, transmitted through the first beam splitting film 32, reflected by the reflecting film 31, and then emerges from the wavelength-selective polarization conversion element 5 as P-polarized light.

Furthermore, S-polarized light of the R wavelength region is transmitted through the first beam splitting film 32, converted into P-polarized light by being transmitted through the phase plate 33, transmitted through the second beam splitting film 34, and then emerges from the wavelength-selective polarization conversion element 5 as P-polarized light.

As described above, the white non-polarized light which enters the wavelength-selective polarization conversion element 5 constructed as a single element is converted into S-polarized light of the B and G wavelength regions and P-polarized light of the R wavelength region to emerge from the element 5.

Therefore, it is possible to introduce the light of the and R wavelength regions from the dichroic mirror 8 to the third polarization beam splitter 13 without using a wavelength-selective phase plate that is conventionally provided therebetween.

Thereby, the third polarization beam splitter 13 can separate the light of the B wavelength region from the light of the R wavelength region according to their polarization directions to introduce them to the B and R liquid crystal panels 15 and 14, respectively.

This makes it possible to reduce the number of optical elements constituting the optical system, compared to a conventional case where a wavelength-selective phase plate is provided in the optical path from the dichroic mirror 8 to the third polarization beam splitter 13. This can eliminate the wavelength-selective phase plate, thereby making it possible to eliminate configurations to hold and cool it.

FIG. 18 shows configuration examples of the first and second beam splitting films 32 and 34 described with FIGS. 3 and 4, which are multilayer films. These beam splitting films 32 and 34 include the glass substrate made of PBH56 produced by OHARA Inc.

'H', 'M' and 'L' in the figure denote a high-refractive index layer, a medium-refractive index layer and a low-refractive index layer, respectively. Numbers on the left side of 'H', 'M' and 'L' denote thickness (nm) of each layer (film). This embodiment uses $TiO_2$ as the high-refractive index layer, $Al_2O_3$ as the medium-refractive index layer and $SiO_2$ as the low-refractive index layer.

Figure 19:
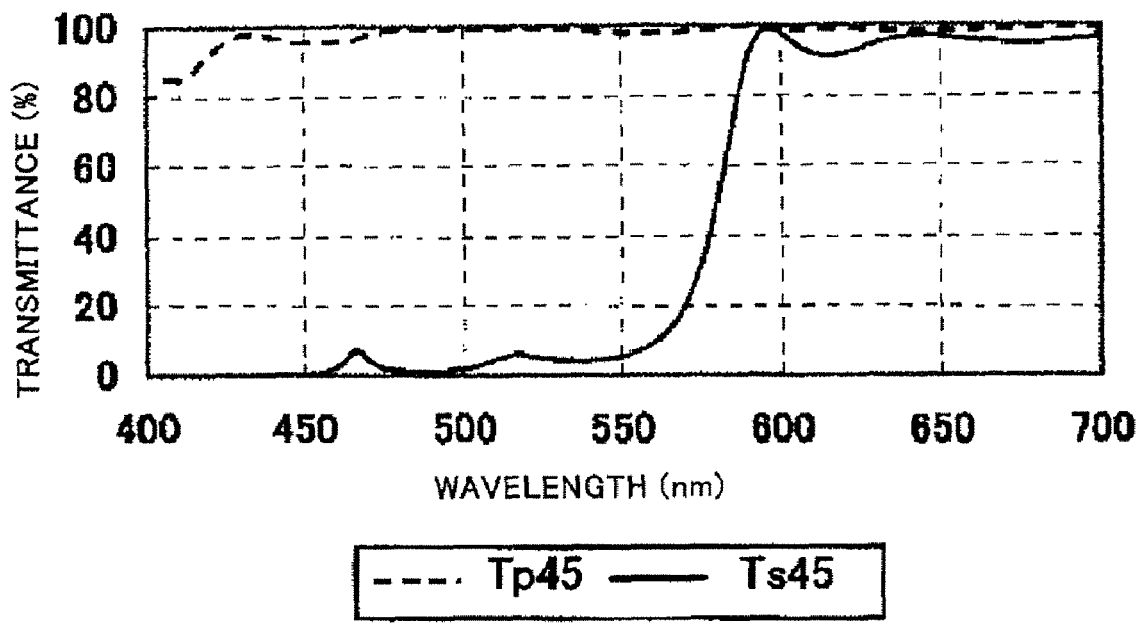
FIG. 19 is a diagram showing a spectral characteristic of the first beam splitting film showing in FIG. 18.
Figure 20:
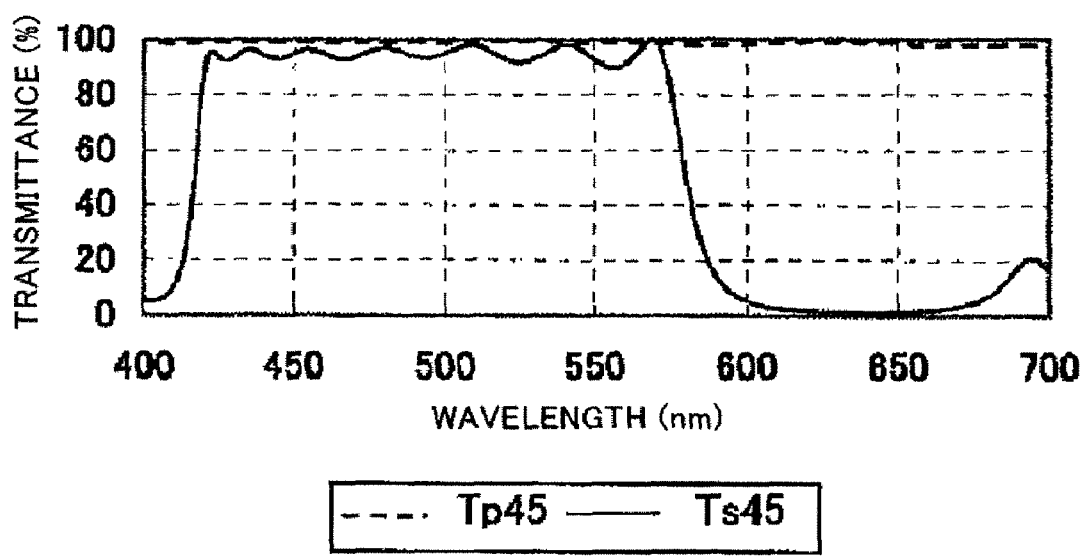
FIG. 20 is a diagram showing a spectral characteristic of the second beam splitting film showing in FIG. 18.

FIGS. 19 and 20 shows the transmittance characteristic data of the first and second beam splitting films 32 and 34 having the film configuration shown in FIG. 18. 'Tp45' denotes the transmittance characteristic in a case where P-polarized light enters the beam splitting film at an incident angle of 45 degrees. 'Ts45' denotes the transmittance characteristic in a case where S-polarized light enters the beam splitting film at an incident angle of 45 degrees.

Although specific film configurations will not shown in the following embodiments, appropriate modification of the film configuration shown in this embodiment enables obtaining a characteristic corresponding to each of the following embodiments.

Next, the reason for locating the wavelength-selective polarization conversion element 5 between the second fly-eye lens 4 and the condenser lens 6 will be described.

The fly-eye lenses 3 and 4 have a function to divide the parallel luminous flux coming from the parabolic reflector 2 into plural luminous fluxes and a function to collect each of the divided luminous fluxes near the wavelength-selective polarization conversion element 5.

On the other hand, the condenser lens 6 has a function to collect the plurally divided luminous fluxes so that they are overlapped with each other on the liquid crystal panel. In this case, the collection degree of the divided luminous flux by the second fly-eye lens 4 toward the wavelength-selective polarization conversion element 5 is smaller than that by the condenser lens 6.

Since spectral characteristics of multilayer film such as dichroic films and polarization beam splitting films generally have strong incident angle dependency, good spectral characteristics close to designed ones can be obtained at an incident angle of 45 degrees, but the spectral characteristics tend to shift as the incident angle changes from 45 degrees. In other words, wavelength regions which are separated by the multilayer film move.

As described above, the collection degree of the luminous flux by the condenser lens 6 is large. Therefore, if the wavelength-selective polarization conversion element 5 is located closer to the liquid crystal panel than to the condenser lens 6, the spectral characteristics of the first and second beam splitting films 32 and 34 that constitute the wavelength-selective polarization conversion element 5 shift. Thereby, a large amount of light with an undesired polarization direction is included in the light of each wavelength region which enters the liquid crystal panel, resulting in deterioration of contrast of projected images.

To address this problem, in this embodiment, the wavelength-selective polarization conversion element 5 is located between the second fly-eye lens 4 and the condenser lens 6. This lowers the collection degree of the luminous flux entering the wavelength-selective polarization conversion element 5 (in other words, makes the entering luminous flux approximately parallel).

Thereby, it is possible to obtain good spectral characteristics of the first and second beam splitting films 32 and 34 that constitute the wavelength-selective polarization conversion element 5. Therefore, according to this embodiment, it is possible to project images with high contrast by utilizing an appropriate spectral characteristic of the wavelength-selective polarization conversion element 5.

The location of the wavelength-selective polarization conversion element between the second fly-eye lens and the condenser lens also applies to the following embodiments.

Embodiment 2

Figure 5:
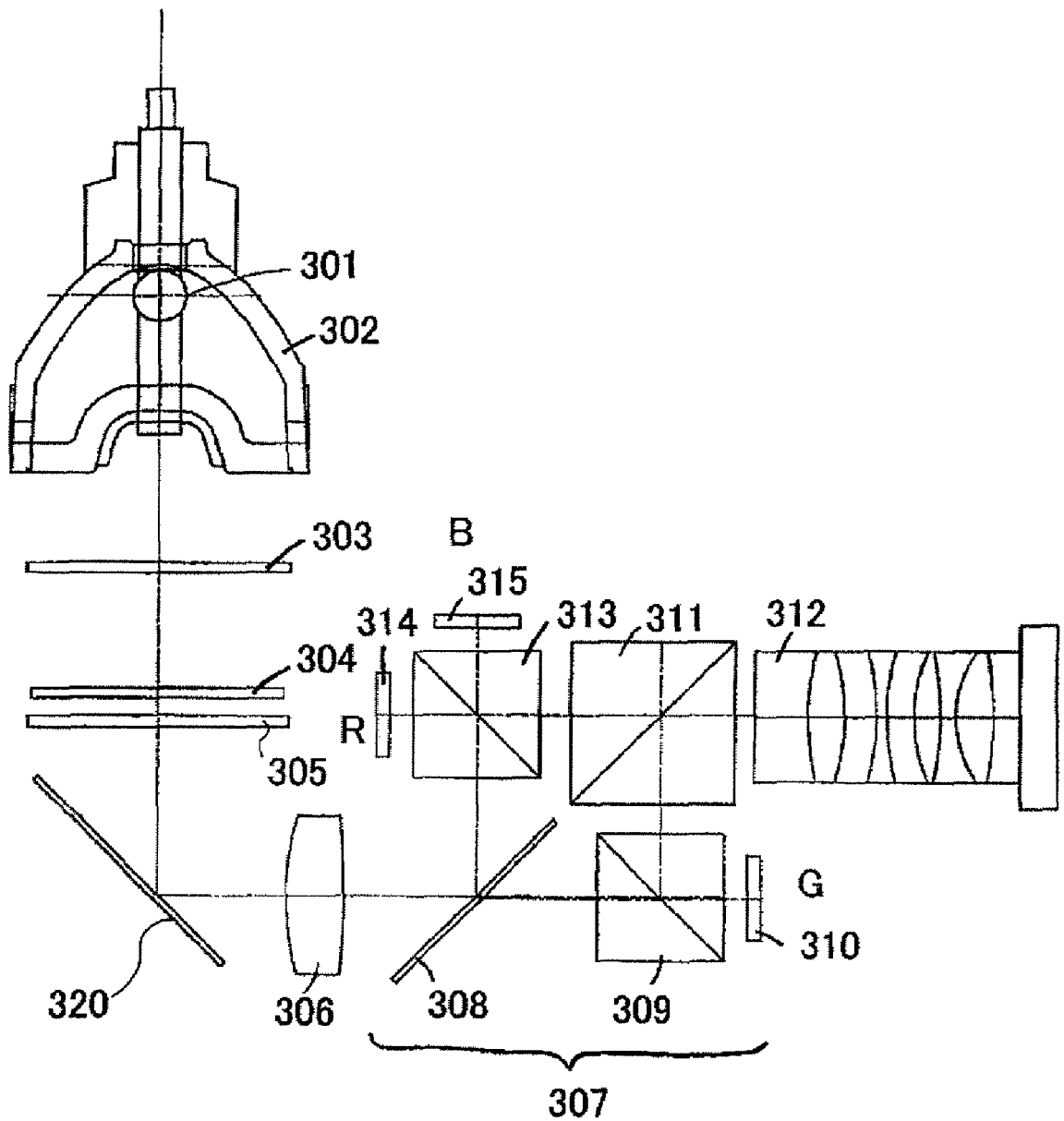
FIG. 5 is a figure showing the configuration of the projection displaying optical system that is Embodiment 2 of the present invention.

FIG. 5 shows a projection displaying optical system using a wavelength-selective polarization conversion element that is Embodiment 2 of the present invention.

A luminous flux emitted from a white light source 301 is converted into a parallel luminous flux by a parabolic reflector 302. The parallel luminous flux is divided into plural luminous fluxes by a first fly-eye lens 303, each luminous flux being collected. Each of the luminous fluxes is collected near a second fly-eye lens 304 and a wavelength-selective polarization conversion element 305 and forms an image of the light source (secondary light source image).

Each of the fly-eye lenses 303 and 304 is constituted by a plurality of lens cells arranged two-dimensionally. Each lens cell has a rectangular shape similar to the shape of a liquid crystal panel (image-forming element), described later, which forms a plane to be illuminated.

The wavelength-selective polarization conversion element 305 converts light of B and G wavelength regions of each divided luminous flux that emerged from the second fly-eye lens 304 into P-polarized light that is linearly polarized light with a second polarization direction. The B and G wavelength regions correspond to first and second wavelength regions, respectively. The wavelength-selective polarization conversion element 305 also converts light of R wavelength region that corresponds to a third wavelength region into S-polarized light that is linearly polarized light with a first polarization direction.

The P-polarized light of the B and G wavelength regions and the S-polarized light of the R wavelength region that emerged from the wavelength-selective polarization conversion element 305 are reflected by a mirror 320. Then, the divided luminous fluxes are collected by a condenser lens 306, passed through a color-separating/combining optical system 307 and overlapped with each other to illuminate reflective liquid crystal panels 315, 310 and 314 for the B, G and R wavelength regions.

The color-separating/combining optical system 307 includes a dichroic mirror 308 which reflects the light of the B and R wavelength regions of the polarized light transmitted through the condenser lens 306 and transmits the light of the G wavelength region. The polarized light of the G wavelength region transmitted through the dichroic mirror 308 is transmitted through a first polarization beam splitter 309 and enters the reflective G liquid crystal panel 310.

Image light (polarized light) from the G liquid crystal panel 310 is reflected by the first polarization beam splitter 309, further reflected by a wavelength-selective polarization beam splitter 311 and then projected onto a screen, not shown, by a projection lens 312. The wavelength-selective polarization beam splitter 311 transmits S-polarized light of the B wavelength region, reflects S-polarized light of the G wavelength region, reflects S-polarized light of the R wavelength region, and transmits P-polarized light of the R wavelength region.

On the other hand, the B wavelength region polarized light of the polarized light of the B and R wavelength regions reflected by the dichroic mirror 308 is transmitted through a second polarization beam splitter 313, and the R wavelength region polarized light is reflected by the second polarization beam splitter 313. The B wavelength region polarized light and the R wavelength region polarized light that emerged from the second polarization beam splitter 313 are collected on the reflective B liquid crystal panel 315 and reflective R liquid crystal panel 314, respectively.

The B wavelength region polarized light reflected and modulated by the B liquid crystal panel 315 is reflected by the second polarization beam splitter 313. The R wavelength region polarized light reflected and modulated by the R liquid crystal panel 314 is transmitted through the second polarization beam splitter 313. Then, the polarized light of the B and R wavelength regions is transmitted through the wavelength-selective polarization beam splitter 311 and projected on the screen by the projection lens 312.

Figure 6:
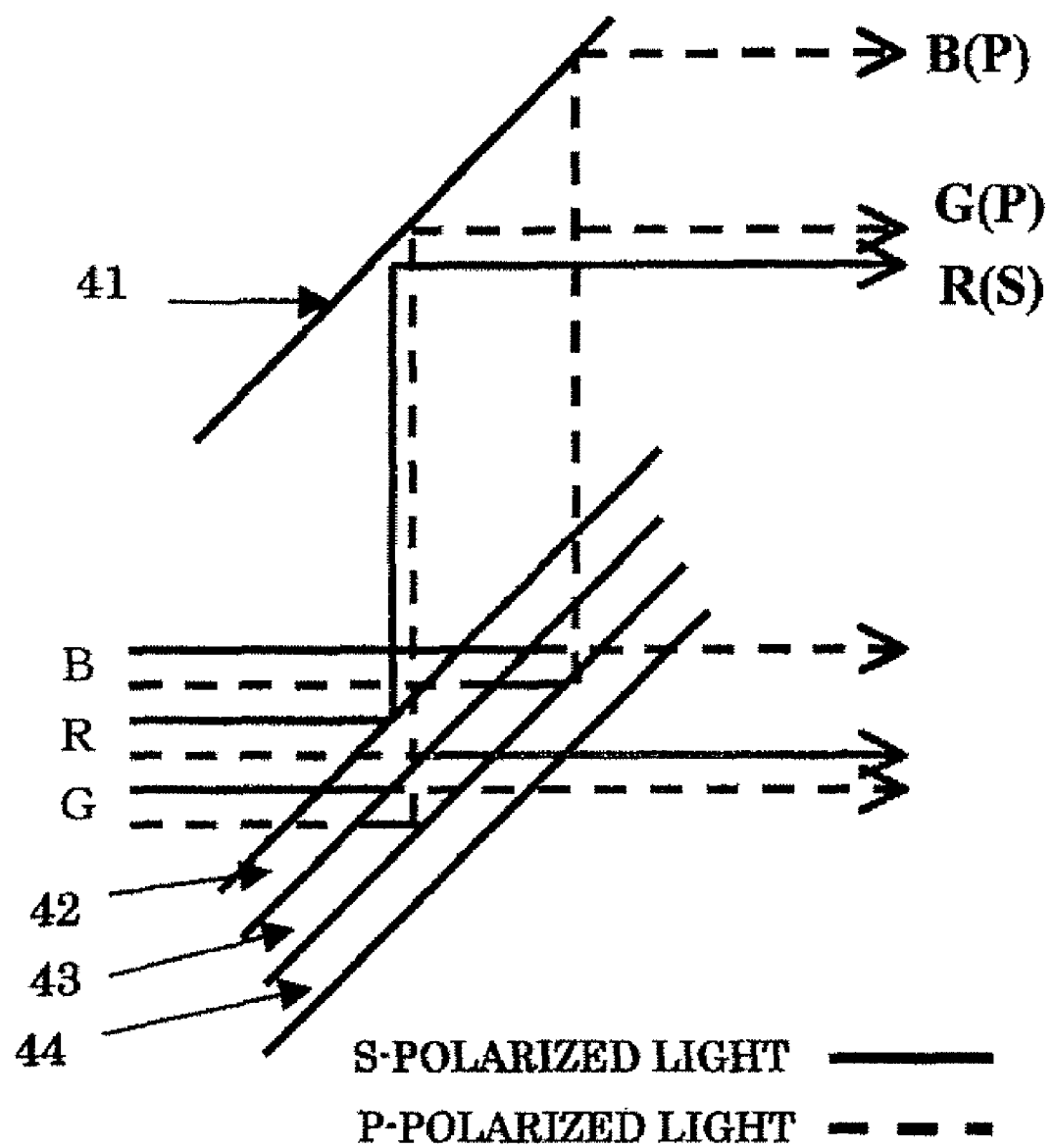
FIG. 6 is a schematic view showing the structure of the wavelength-selective polarization conversion element that is used in Embodiment 2.

Next, the structure and the optical function of the wavelength-selective polarization conversion element 305 will be described with reference to FIG. 6. The overall structure of the wavelength-selective polarization conversion element 305 is similar to that shown in the figure on the right side in FIG. 2. FIG. 6 shows the enlarged and schematic structure of one of wavelength-selective polarization conversion cells of the wavelength-selective polarization conversion element 305.

41 denotes a reflecting film. In order from the light-entering side, 42 denotes a first wavelength-selective polarization beam splitting film, 43 a phase plate, and 44 a second wavelength-selective polarization beam splitting film. Hereinafter, the wavelength-selective polarization beam splitting film is abbreviated as the beam splitting film.

These first beam splitting film 42, phase plate 43 and second beam splitting film 44 form an angle of 45 degrees to an light-entering axis direction (a direction from the left side toward the right side in the figure). The reflecting film 41 is located parallel to the first beam splitting film 42. Each of the first and second beam splitting films 42 and 44 is actually formed as a multilayer film on a surface of a substrate such as a glass plate or an acrylic plate, which is a parallel plate. The phase plate 43 is formed like a film and attached on a similar substrate.

FIGS. 7 and 8 show characteristics of the first and second beam splitting films 42 and 44, respectively. The first beam splitting film 42 has a characteristic in which the transmittance for S-polarized light of the B and G wavelength regions is equal to or near 100% (in other words, higher than 50%) and the transmittance for S-polarized light of the R wavelength region is equal to or near 0% (in other words, lower than 50%).

On the other hand, the second beam splitting film 44 has a characteristic in which the transmittance for S-polarized light of the B and G wavelength regions is equal to or near 0% (in other words, lower than 50%) and the transmittance for S-polarized light of the R wavelength region is equal to or near 100% (in other words, higher than 50%). As described above, the first and second beam splitting films 42 and 44 have characteristics in which their transmittances for S-polarized light are opposite to each other in each wavelength regions.

In addition, the first and second beam splitting films 42 and 44 have characteristics in which the transmittance for P-polarized light is equal to or near 100% (in other words, higher than 50%) regardless of wavelength regions.

Further, the phase plate 43 is a half-wave plate and has a function to rotate the polarization direction of linearly polarized light by 90 degrees.

White non-polarized light enters the wavelength-selective selective polarization conversion element 305 constructed as above from the left side in FIG. 6. Of the non-polarized light, P-polarized light of the R wavelength region is transmitted through the first beam splitting film 42, converted into S-polarized light by being transmitted through the phase plate 43, transmitted through the second beam splitting film 44, and then emerges from the wavelength-selective polarization conversion element 305 as S-polarized light.

S-polarized light of the R wavelength region is reflected by the first beam splitting film 42, reflected by the reflecting film 41, and then emerges from the wavelength-selective polarization conversion element 305 as S-polarized light.

P-polarized light of the B and G wavelength regions is transmitted through the first beam splitting film 42, converted into S-polarized light by being transmitted through the phase plate 43, and then reflected by the second beam splitting film 44. The reflected light is converted into P-polarized light by being transmitted through the phase plate 43 again, transmitted through the first beam splitting film 42, reflected by the reflecting film 41, and then emerges from the wavelength-selective polarization conversion element 305 as P-polarized light.

Furthermore, S-polarized light of the B and G wavelength regions is transmitted through the first beam splitting film 42, converted into P-polarized light by being transmitted through the phase plate 43, transmitted through the second beam splitting film 44, and then emerges from the wavelength-selective polarization conversion element 305 as P-polarized light.

As described above, the white non-polarized light which enters the wavelength-selective polarization conversion element 305 constructed as a single element is converted into P-polarized light of the B and G wavelength regions and S-polarized light of the R wavelength region and emerges from the element 305. Thereby, an effect similar to that of Embodiment 1 can be obtained.

Embodiment 3

Figure 9:
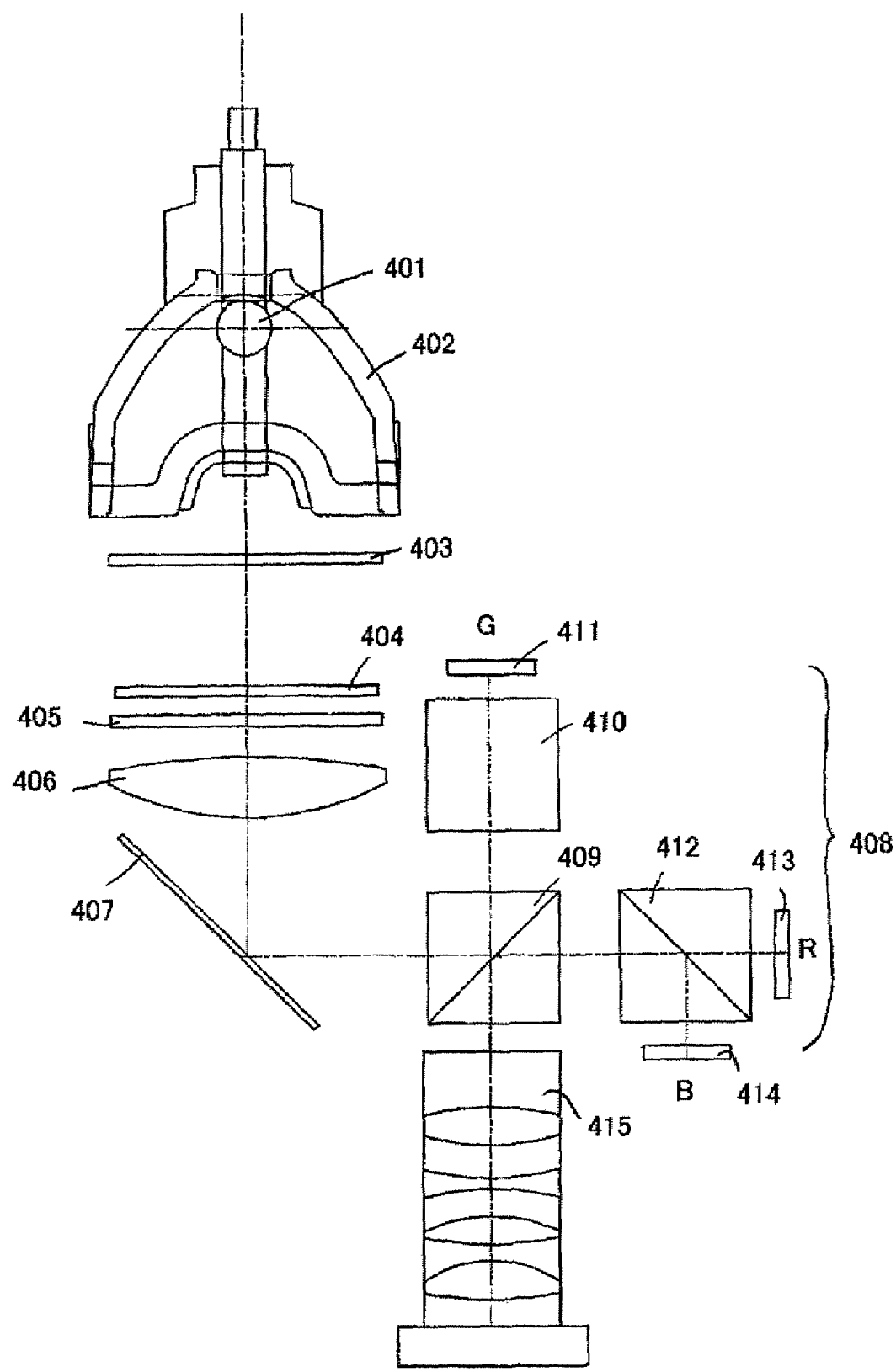
FIG. 9 is a figure showing the configuration of the projection displaying optical system that is Embodiment 3 of the present invention.

FIG. 9 shows a projection displaying optical system using a wavelength-selective polarization conversion element that is Embodiment 3 of the present invention.

A luminous flux emitted from a white light source 401 is converted into a parallel luminous flux by a parabolic reflector 402. The parallel luminous flux is divided into plural luminous fluxes by a first fly-eye lens 403, each luminous flux being collected. Each of the luminous fluxes is collected near a second fly-eye lens 404 and a wavelength-selective polarization conversion element 405 and forms an image of the light source (secondary light source image).

Each of the fly-eye lenses 403 and 404 is constituted by a plurality of lens cells arranged two-dimensionally. Each lens cell has a rectangular shape similar to the shape of a liquid crystal panel, described later, which forms a plane to be illuminated.

The wavelength-selective polarization conversion element 405 converts light of B and R wavelength regions of each divided luminous flux that emerged from the second fly-eye lens 404 into P-polarized light that is linearly polarized light with a second polarization direction. The B and R wavelength regions correspond to first and third wavelength regions, respectively. The wavelength-selective polarization conversion element 405 also converts light of G wavelength region that corresponds to a second wavelength region into S-polarized light that is linearly polarized light with a first polarization direction.

The P-polarized light of the B and R wavelength regions and the S-polarized light of the G wavelength region that emerged from the wavelength-selective polarization conversion element 405 are collected by a condenser lens 406. Then, they are reflected by a mirror 407, passed through a color-separating/combining optical system 408 and overlapped with each other to illuminate reflective liquid crystal panels 414, 411 and 413 for the B, G and R wavelength regions.

The color-separating/combining optical system 408 includes a polarization beam splitter 409 which transmits light of the B and R wavelength regions of the polarized light and reflects light of the G wavelength region thereof. The polarized light of the G wavelength region reflected by the polarization beam splitter 409 is transmitted through a glass block 410 and enters the reflective G liquid crystal panel 411.

Image light (polarized light) from the G liquid crystal panel 411 is transmitted through the glass block 410, further transmitted through the polarization beam splitter 409 and then projected onto a screen, not shown, by a projection lens 415.

On the other hand, the B wavelength region polarized light of the polarized light of the B and R wavelength regions transmitted through the polarization beam splitter 409 is reflected by a dichroic prism 412, and the R wavelength region polarized light is transmitted through the dichroic prism 412. The B wavelength region polarized light and the R wavelength region polarized light that emerged from the dichroic prism 412 are collected on the reflective B liquid crystal panel 414 and reflective R liquid crystal panel 413, respectively.

The B wavelength region polarized light reflected and modulated by the B liquid crystal panel 414 is reflected by the dichroic prism 412. The R wavelength region polarized light reflected and modulated by the R liquid crystal panel 413 is transmitted through the dichroic prism 412. Then, the polarized light of the B and R wavelength regions is reflected by the polarization beam splitter 409 and projected on the screen by the projection lens 415.

Figure 10:
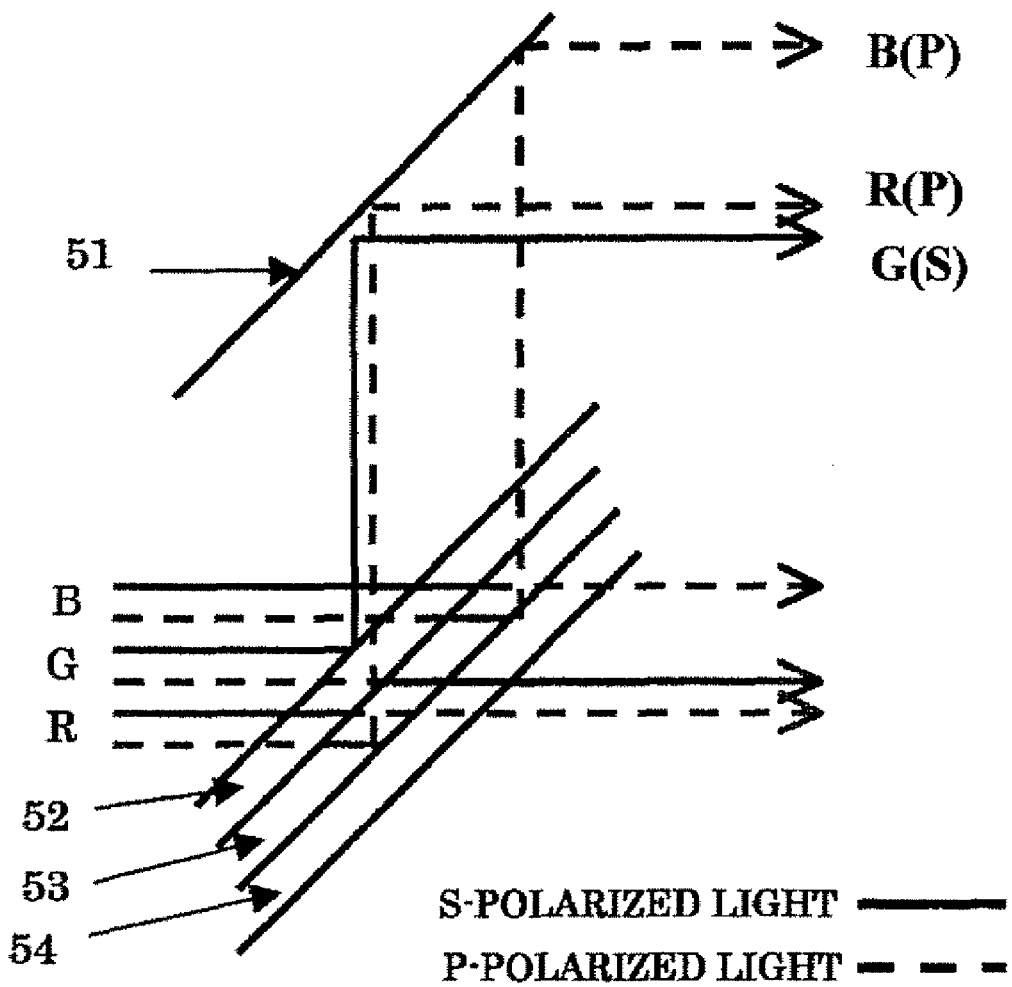
FIG. 10 is a schematic view showing the structure of the wavelength-selective polarization conversion element that is used in Embodiment 3.

Next, the structure and the optical function of the wavelength-selective polarization conversion element 405 will be described with reference to FIG. 10. The overall structure of the wavelength-selective polarization conversion element 405 is similar to that shown in the figure on the right side in FIG. 2. FIG. 10 shows the enlarged and schematic structure of one of wavelength-selective polarization conversion cells of the wavelength-selective polarization conversion element 405.

51 denotes a reflecting film. In order from the light-entering side, 52 denotes a first wavelength-selective polarization beam splitting film, 53 a phase plate, and 54 a second wavelength-selective polarization beam splitting film. Hereinafter, the wavelength-selective polarization beam splitting film is abbreviated as the beam splitting film.

These first beam splitting film 52, phase plate 53 and second beam splitting film 54 form an angle of 45 degrees to an light-entering axis direction (a direction from the left side toward the right side in the figure). The reflecting film 51 is located parallel to the first beam splitting film 52. Each of the first and second beam splitting films 52 and 54 is actually formed as a multilayer film on a surface of a substrate such as a glass plate or an acrylic plate, which is a parallel plate. The phase plate 53 is formed like a film and attached on a similar substrate.

Figures 11, 12:
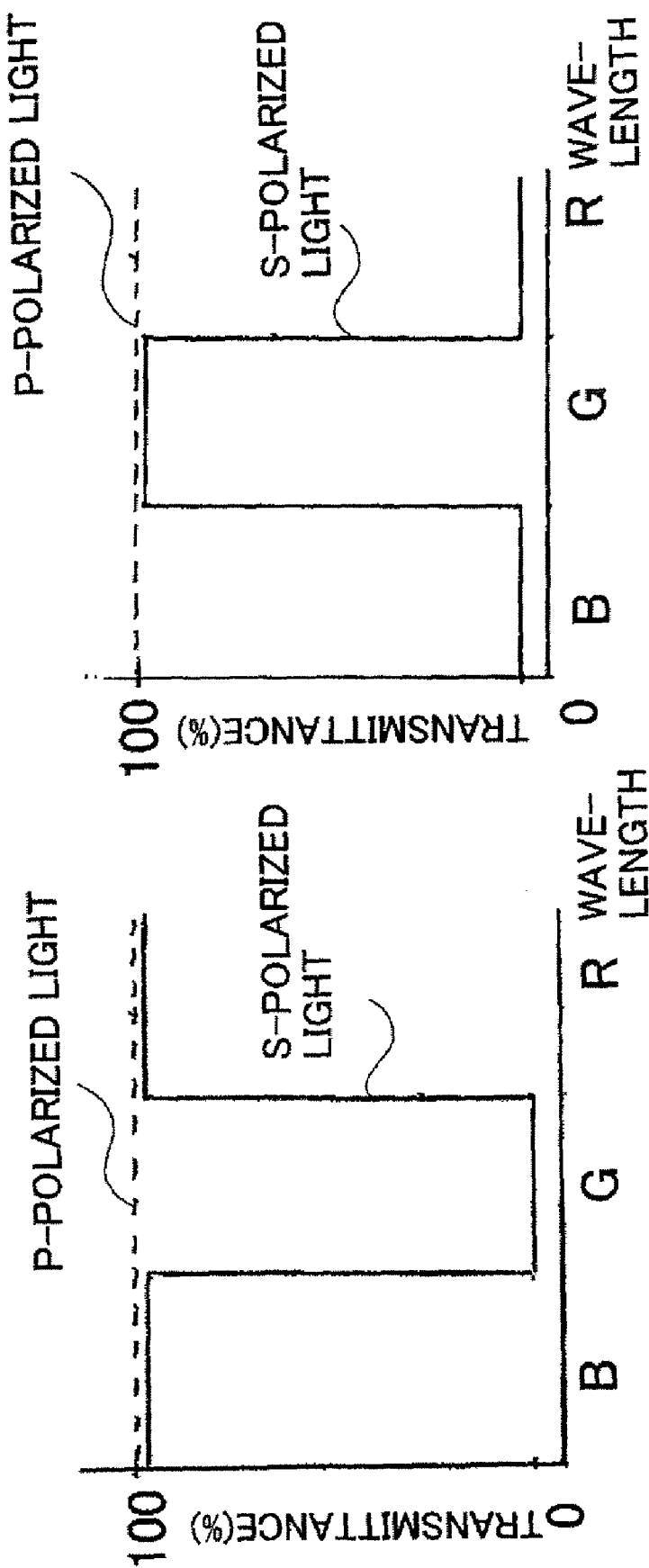
FIG. 11 is a diagram showing a characteristic of the first beam splitting film that constitutes the wavelength-selective polarization conversion element in Embodiment 3.
FIG. 12 is a diagram showing a characteristic of the second beam splitting film that constitutes the wavelength-selective polarization conversion element in Embodiment 3.

FIGS. 11 and 12 show characteristics of the first and second beam splitting films 52 and 54, respectively. The first beam splitting film 52 has a characteristic in which the transmittance for S-polarized light of the B and R wavelength regions is equal to or near 100% (in other words, higher than 50%) and the transmittance for S-polarized light of the G wavelength region is equal to or near 0% (in other words, lower than 50%).

On the other hand, the second beam splitting film 54 has a characteristic in which the transmittance for S-polarized light of the B and R wavelength regions is equal to or near 0% (in other words, lower than 50%) and the transmittance for S-polarized light of the G wavelength region is equal to or near 100% (in other words, higher than 50%). As described above, the first and second beam splitting films 52 and 54 have characteristics in which their transmittances for S-polarized light are opposite to each other in each wavelength regions.

In addition, the first and second beam splitting films 52 and 54 have characteristics in which the transmittance for P-polarized light is equal to or near 100% (in other words, higher than 50%) regardless of wavelength regions.

Further, the phase plate 53 is a half-wave plate and has a function to rotate the polarization direction of linearly polarized light by 90 degrees.

White non-polarized light enters the wavelength-selective selective polarization conversion element 405 constructed as above from the left side in FIG. 10. Of the non-polarized polarized light, P-polarized light of the G wavelength region is transmitted through the first beam splitting film 52, converted into S-polarized light by being transmitted through the phase plate 53, transmitted through the second beam splitting film 54, and then emerges from the wavelength-selective polarization conversion element 405 as S-polarized light.

S-polarized light of the G wavelength region is reflected by the first beam splitting film 52, reflected by the reflecting film 51, and then emerges from the wavelength-selective polarization conversion element 405 as S-polarized light.

P-polarized light of the B and R wavelength regions is transmitted through the first beam splitting film 52, converted into S-polarized light by being transmitted through the phase plate 53, and then reflected by the second beam splitting film 54. The reflected light is converted into P-polarized light by being transmitted through the phase plate 53 again, transmitted through the first beam splitting film 52, reflected by the reflecting film 51, and then emerges from the wavelength-selective polarization conversion element 405 as P-polarized light.

Furthermore, S-polarized light of the B and R wavelength regions is transmitted through the first beam splitting film 52, converted into P-polarized light by being transmitted through the phase plate 53, transmitted through the second beam splitting film 54, and then emerges from the wavelength-selective polarization conversion element 405 as P-polarized light.

As described above, the white non-polarized light which enters the wavelength-selective polarization conversion element 405 constructed as a single element is converted into P-polarized light of the B and R wavelength regions and S-polarized light of the G wavelength region and emerges from the element 405. Thereby, an effect similar to that of Embodiment 1 can be obtained.

Embodiment 4

Figure 13:
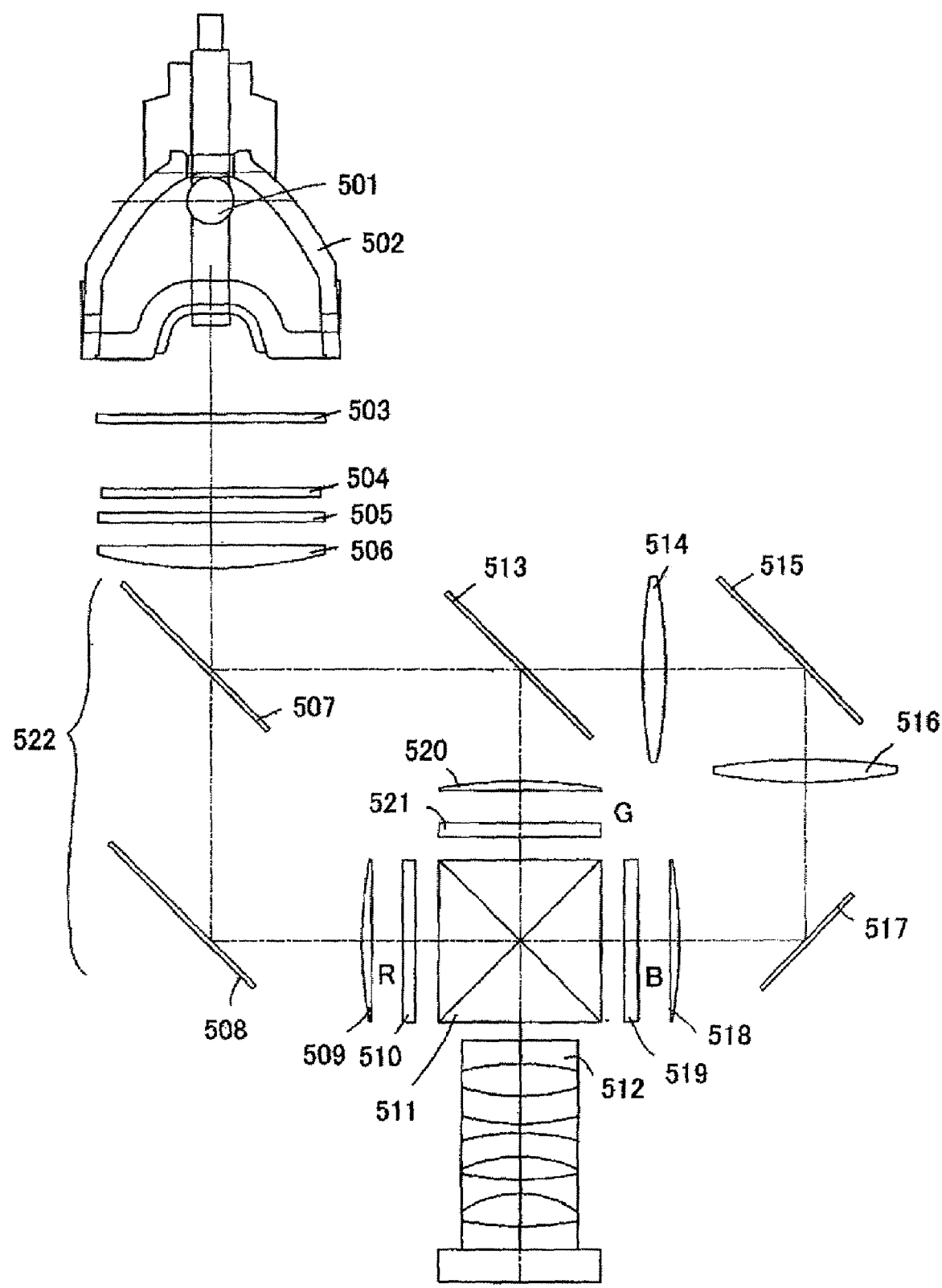
FIG. 13 is a figure showing the configuration of the projection displaying optical system that is Embodiment 4 of the present invention.

FIG. 13 shows a projection displaying optical system using a wavelength-selective polarization conversion element that is Embodiment 4 of the present invention.

A luminous flux emitted from a white light source 501 is converted into a parallel luminous flux by a parabolic reflector 502. The parallel luminous flux is divided into plural luminous fluxes by a first fly-eye lens 503, each luminous flux being collected. Each of the luminous fluxes is collected near a second fly-eye lens 504 and a wavelength-selective polarization conversion element 505 and forms an image of the light source (secondary light source image).

Each of the fly-eye lenses 503 and 504 is constituted by a plurality of lens cells arranged two-dimensionally. Each lens cell has a rectangular shape similar to the shape of a liquid crystal panel, described later, which forms a plane to be illuminated.

The wavelength-selective polarization conversion element 505 converts light of B and R wavelength regions of each divided luminous flux that emerged from the second fly-eye lens 504 into S-polarized light that is linearly polarized light with a first polarization direction. The B and R wavelength regions correspond to first and third wavelength regions, respectively. The wavelength-selective polarization conversion element 505 also converts light of G wavelength region that corresponds to a second wavelength region into P-polarized light that is linearly polarized light with a second polarization direction.

The S-polarized light of the B and R wavelength regions and the P-polarized light of the G wavelength region that emerged from the wavelength-selective polarization conversion element 505 are collected by a condenser lens 506. Then, they are passed through a color-separating/combining optical system 522 and overlapped with each other to illuminate transmissive liquid crystal panels 519, 521 and 510 for the B, G and R wavelength regions (hereinafter, referred to as B, G and R liquid crystal panels).

The color-separating/combining optical system 522 includes a first dichroic mirror 507 which transmits light of the R wavelength region and reflects light of the B and G wavelength regions. The polarized light of the R wavelength region transmitted through the first dichroic mirror 507 is reflected by a reflecting mirror 508, transmitted through a field lens 509 and then enters the R liquid crystal panel 510. Light (image light) modulated by the R liquid crystal panel 510 is reflected by a dichroic prism 511 and then projected onto a screen, not shown, by a projection lens 512.

On the other hand, the G wavelength region polarized light of the polarized light of the B and G wavelength regions reflected by the first dichroic mirror 507 is reflected by a second dichroic mirror 513, and the B wavelength region polarized light is transmitted therethrough. The G wavelength region polarized light reflected by the second dichroic mirror 513 is transmitted through a field lens 520 and enters the G liquid crystal panel 521. Light modulated by the G liquid crystal panel 521 is transmitted through the dichroic prism 511 and then projected onto the screen by the projection lens 512.

The B wavelength region polarized light transmitted through the second dichroic mirror 513 enters the B liquid crystal panel 519 via relay lenses 514, 516, reflecting mirrors 515, 517 and a field lens 518. Light modulated by the B liquid crystal panel 519 is reflected by the dichroic prism 511 and then projected onto the screen by the projection lens 512.

Figure 14:
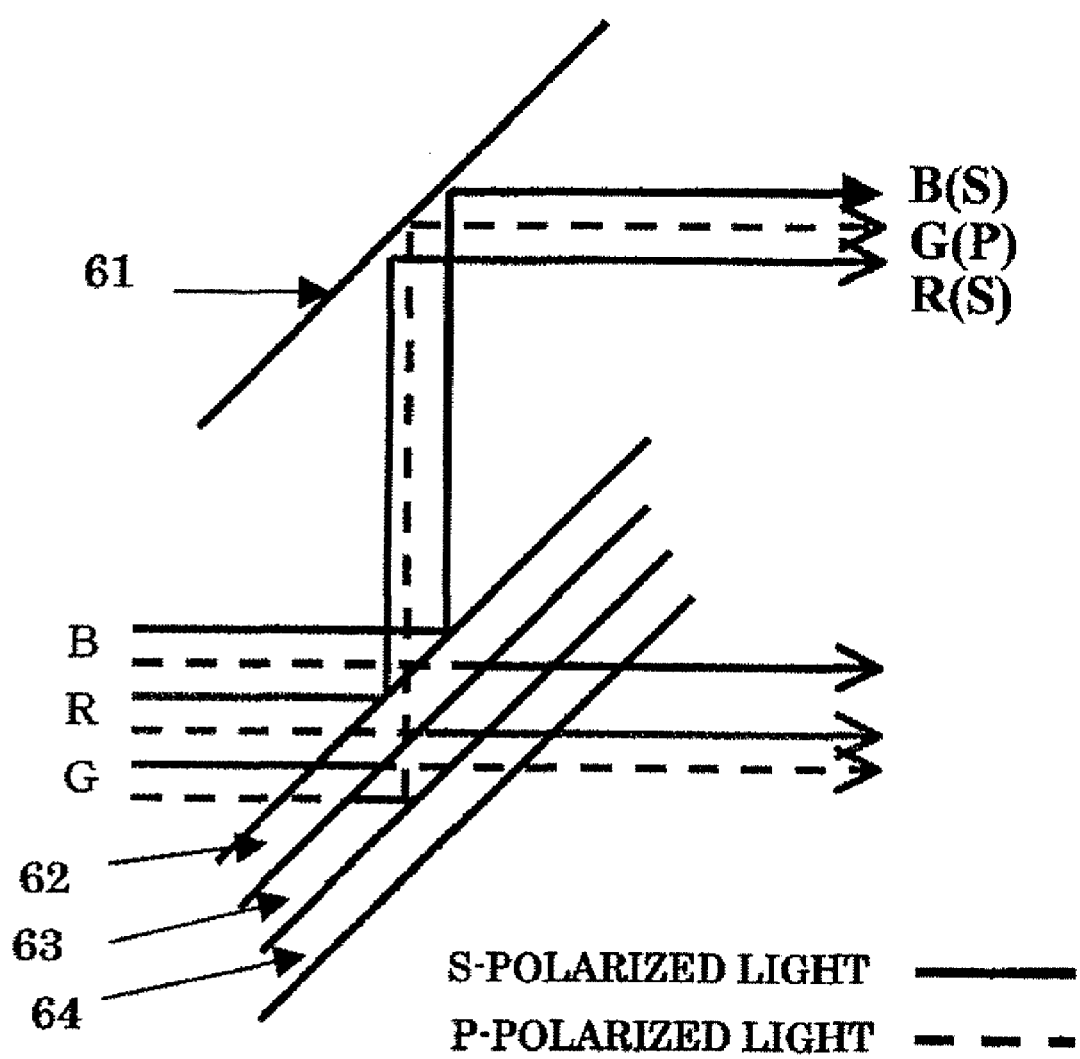
FIG. 14 is a schematic view showing the structure of the wavelength-selective polarization conversion element that is used in Embodiment 4.

Next, the structure and the optical function of the wavelength-selective polarization conversion element 505 will be described with reference to FIG. 14. The overall structure of the wavelength-selective polarization conversion element 505 is similar to that shown in the figure on the right side in FIG. 2. FIG. 14 shows the enlarged and schematic structure of one of wavelength-selective polarization conversion cells of the wavelength-selective polarization conversion element 505.

61 denotes a reflecting film. In order from the light-entering side, 62 denotes a first wavelength-selective polarization beam splitting film, 63 a phase plate, and 64 a second wavelength-selective polarization beam splitting film. Hereinafter, the wavelength-selective polarization beam splitting film is abbreviated as the beam splitting film.

These first beam splitting film 62, phase plate 63 and second beam splitting film 64 form an angle of 45 degrees to an light-entering axis direction (a direction from the left side toward the right side in the figure). The reflecting film 61 is located parallel to the first beam splitting film 62. Each of the first and second beam splitting films 62 and 64 is actually formed as a multilayer film on a surface of a substrate such as a glass plate or an acrylic plate, which is a parallel plate. The phase plate 63 is formed like a film and attached on a similar substrate.

Figure 16:
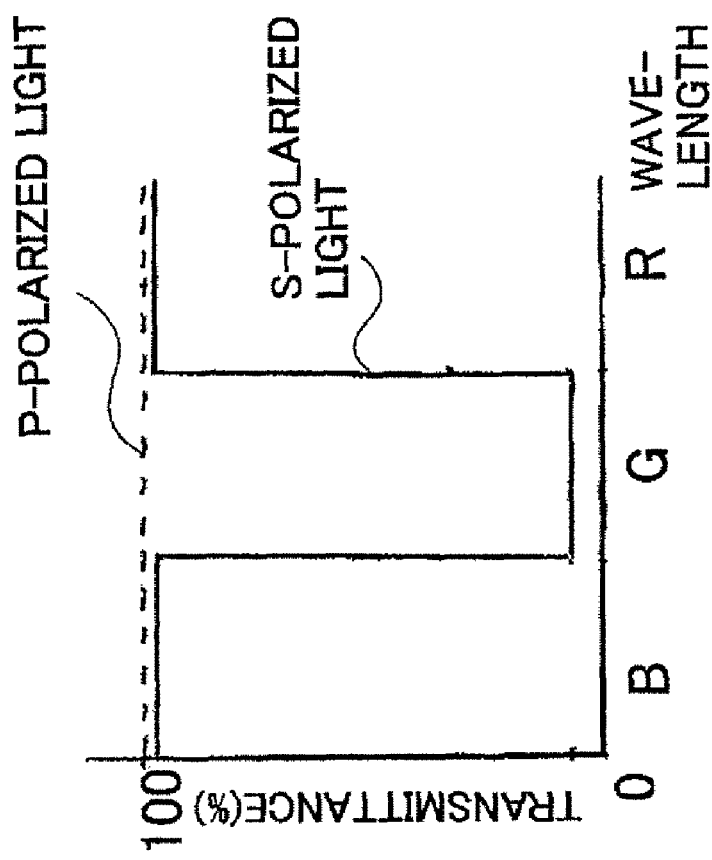
FIG. 16 is a diagram showing a characteristic of the second beam splitting film that constitutes the wavelength-selective polarization conversion element in Embodiment 4.
Figure 15:
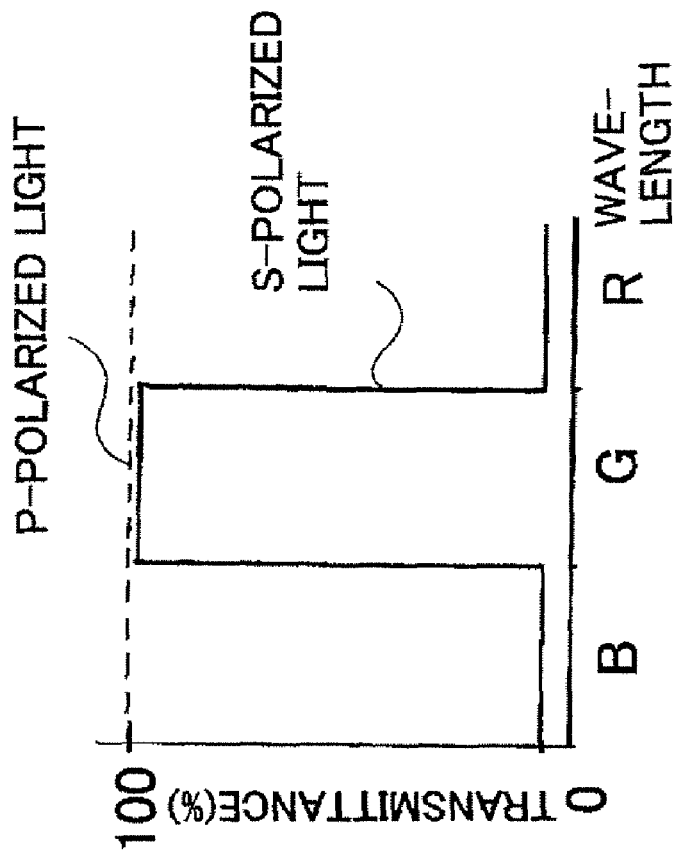
FIG. 15 is a diagram showing a characteristic of the first beam splitting film that constitutes the wavelength-selective polarization conversion element in Embodiment 4.

FIGS. 15 and 16 show characteristics of the first and second beam splitting films 62 and 64, respectively. The first beam splitting film 62 has a characteristic in which the transmittance for S-polarized light of the B and R wavelength regions is equal to or near 0% (in other words, lower than 50%) and the transmittance for S-polarized light of the G wavelength region is equal to or near 100% (in other words, higher than 50%).

On the other hand, the second beam splitting film 64 has a characteristic in which the transmittance for S-polarized light of the B and R wavelength regions is equal to or near 100% (in other words, higher than 50%) and the transmittance for S-polarized light of the G wavelength region is equal to or near 0% (in other words, lower than 50%). As described above, the first and second beam splitting films 62 and 64 have characteristics in which their transmittances for S-polarized light are opposite to each other in each wavelength regions.

In addition, the first and second beam splitting films 62 and 64 have characteristics in which the transmittance for P-polarized light is equal to or near 100% (in other words, higher than 50%) regardless of wavelength regions.

Further, the phase plate 63 is a half-wave plate and has a function to rotate the polarization direction of linearly polarized light by 90 degrees.

White non-polarized light enters the wavelength-selective polarization conversion element 505 constructed as above from the left side in FIG. 14. Of the non-polarized light, P-polarized light of the B and R wavelength regions is transmitted through the first beam splitting film 62, converted into S-polarized light by being transmitted through the phase plate 63, transmitted through the second beam splitting film 64, and then emerges from the wavelength-selective polarization conversion element 505 as S-polarized light.

S-polarized light of the B and R wavelength regions is reflected by the first beam splitting film 62, reflected by the reflecting film 61, and then emerges from the wavelength-selective polarization conversion element 505 as S-polarized light.

P-polarized light of the G wavelength region is transmitted through the first beam splitting film 62, converted into S-polarized light by being transmitted through the phase plate 63, and then reflected by the second beam splitting film 64. The reflected light is converted into P-polarized light by being transmitted through the phase plate 63 again, transmitted through the first beam splitting film 62, reflected by the reflecting film 61, and then emerges from the wavelength-selective polarization conversion element 505 as P-polarized light.

Furthermore, S-polarized light of the G wavelength region is transmitted through the first beam splitting film 62, converted into P-polarized light by being transmitted through the phase plate 63, transmitted through the second beam splitting film 64, and then emerges from the wavelength-selective polarization conversion element 505 as P-polarized light.

As described above, the white non-polarized light which enters the wavelength-selective polarization conversion element 505 constructed as a single element is converted into S-polarized light of the B and R wavelength regions and P-polarized light of the G wavelength region and emerges from the element 505. Thereby, an effect similar to that of Embodiment 1 can be obtained.

Figure 17:
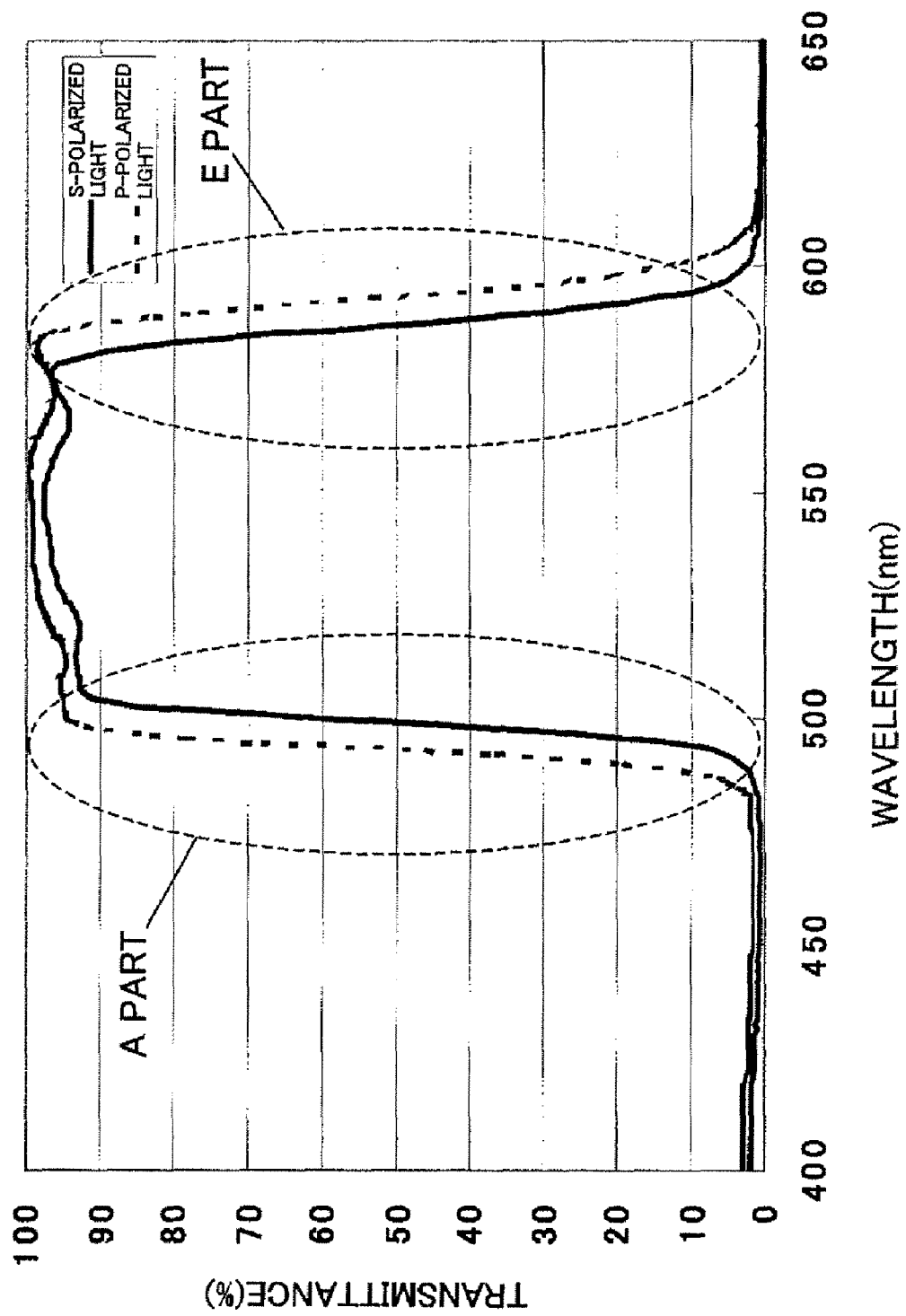
FIG. 17 is a diagram showing a spectral characteristic of a dichroic prism.

In the configuration which uses a conventional polarization conversion element and transmissive liquid crystal panels, a phase plate which rotates the direction of linearly polarized light by 90 degrees is provided between the field lens 520 and the G liquid crystal panel 521, shown in FIG. 13. This is for suppressing loss of light, which is generated at the rising part (A part) and the falling part (E part) of the spectral characteristics of the dichroic prism as shown in FIG. 17, by using P-polarized light of the G wavelength region and S-polarized light of the R and B wavelength regions.

In contrast, in this embodiment, using the wavelength-selective polarization conversion element 505 makes it possible to achieve an effect similar to the above one without locating a phase plate between the field lens 520 and the G liquid crystal panel 521.

Although this embodiment locates the liquid crystal panels 510, 519 and 521 for the R, B and G wavelength regions as shown in FIG. 13, location of the liquid crystal panels for these wavelength regions in the present invention is not limited thereto.

As described above, according to each of the embodiments, by the effect of the polarization beam splitting film having a characteristic in which its transmittance for light with a specific polarization direction changes depending on wavelength regions and the effect of the phase plate in the wavelength-selective polarization conversion element 505, non-polarized light of two of the first to third wavelength regions is converted into a first polarized light and non-polarized light of the remaining one wavelength region is converted into a second polarized light with a polarization direction different from that of the first polarized light. This makes it possible to achieve a polarization conversion element as a single element having a wavelength-selective polarization conversion function.

Therefore, it is possible to introduce the light of one of the two wavelength regions and the light of the other wavelength region from the same optical path to a polarization beam splitter without using a conventional wavelength-selective phase plate. Thereby, the polarization beam splitter can separate the light of the one wavelength region from the light of the other wavelength region according to their polarization directions.

Accordingly, in a projection displaying optical system or an image projection apparatus which uses the polarization beam splitter for performing color-separation and introducing the first wavelength region light, the second wavelength region light and the third wavelength region light to corresponding image-forming elements, it is possible to reduce the number of optical elements as compared to a conventional optical system or image projection apparatus. Furthermore, since the wavelength-selective phase plate is eliminated, it is possible to eliminate configurations to hold and cool it, thereby enabling simplification of the configuration of the image projection apparatus.

Other wavelength-selective polarization conversion elements whose structures are different from that in the above-described embodiments may be used. For example, a wavelength-selective polarization conversion element may be used, which has a first beam splitting film that transmits P-polarized light and S-polarized light and a second beam splitting film that transmits P-polarized light and reflects S-polarized light, in a wavelength region where non-polarized light is converted into P-polarized light. In this case the first beam splitting film transmits P-polarized light and reflects S-polarized light and the second beam splitting film transmits P-polarized light and S-polarized light, in a wavelength region where non-polarized light is converted into S-polarized light.

Thereby, it is possible to convert light with any one of R, G and B wavelength regions into P-polarized light and convert light with the remaining two wavelength regions into S-polarized light. Further, it is also possible to convert light with any one of R, G and B wavelength regions into S-polarized light and convert light with the remaining two wavelength regions into P-polarized light.

In addition, in each of the embodiments, the description was made of the case where the wavelength-selective polarization conversion element had two wavelength-selective polarization beam splitting films and only the transmittance of each wavelength-selective polarization beam splitting film for S-polarized light changed largely depending on wavelength regions. However, the present invention can use a wavelength-selective polarization beam splitting film whose transmittances for S-polarized light and P-polarized light change largely depending on wavelength regions, respectively. The present invention can use, for example, a wavelength-selective polarization beam splitting film in which the transmittance for S-polarized light and the transmittance for P-polarized light are opposite to each other in each wavelength region. Using such a wavelength-selective polarization beam splitting film makes it possible to achieve a similar function to the function described in each of the above-described embodiments, by combination of one wavelength-selective polarization beam splitting film and a phase plate.

Furthermore, the description was made of the cases where the reflective or transmissive liquid crystal panels were used as the image-forming elements. However, the present invention can use other image-forming elements such as a DMD (Digital Micromirror Device).

Furthermore, the present invention is not limited to these preferred embodiments and various variations and modifications may be made without departing from the scope of the present invention.

This application claims foreign priority benefits based on Japanese Patent Application No. 2005-266051, filed on Sep. 13, 2005, which is hereby incorporated by reference herein in its entirety as if fully set forth herein.

What is claimed is:

1. A wavelength-selective polarization conversion element which converts non-polarized light including light of a first wavelength region, light of a second wavelength region and light of a third wavelength region into polarized light, the element comprising:

a beam splitting film which splits light by transmission and reflection and has a characteristic in which at least its transmittance for light with a first polarization direction changes between a transmittance higher than 50% and a transmittance lower than 50% depending on wavelength regions; and a phase plate which converts, when transmitting once therethrough the light of the first wavelength region, the light of the second wavelength region and the light of the third wavelength region, a second polarization direction orthogonal to the first polarization direction and the second polarization direction thereof into the first polarization direction, wherein the polarization conversion element converts light of two of the first, second and third wavelength regions into light with one of the first and second polarization directions and converts light of the remaining one wavelength region into light with the other polarization direction, and wherein the beam splitting film and the phase plate are formed integrally with each other.

2. The polarization conversion element according to claim 1, wherein the beam splitting film includes first and second beam splitting films that the wavelength regions in which the transmittance for the light with the first polarization direction is higher than 50% are different from each other and the wavelength regions in which the transmittance for the light with the first polarization direction is lower than 50% are different from each other, and in order from a light-entering side of the polarization conversion element, the first beam splitting film, the phase plate and the second beam splitting film are arranged.

3. The polarization conversion element according to claim 2, wherein the first and second beam splitting films have a characteristic in which the transmittance for the light of the first, second and third wavelength regions with the second polarization direction is higher than 50%.

4. The polarization conversion element according to claim 3, wherein the first beam splitting film has a characteristic in which the transmittance for the light of the two wavelength regions with the first polarization direction is lower than 50% and the transmittance for the light of the remaining one wavelength region with the first polarization direction is higher than 50%, and the second beam splitting film has a characteristic in which the transmittance for the light of the two wavelength regions with the first polarization direction is higher than 50% and the transmittance for the light of the remaining one wavelength region with the first polarization direction is lower than 50%, wherein the light of the two wavelength regions with the first polarization direction is reflected by the first beam splitting film to emerge from the polarization conversion element, the light of the two wavelength regions with the second polarization direction is transmitted through the first beam splitting film, converted into the light with the first polarization direction by the phase plate, and then transmitted through the second beam splitting film to emerge from the polarization conversion element, the light of the remaining one wavelength region with the first polarization direction is transmitted through the first beam splitting film, converted into light with the second polarization direction by the phase plate, and then transmitted through the second beam splitting film to emerge from the polarization conversion element, and the light of the remaining one wavelength region with the second polarization direction is transmitted through the first beam splitting film, converted into light with the first polarization direction by the phase plate, reflected by the second beam splitting film, converted into light with the second polarization direction by the phase plate again, and then transmitted through the first beam splitting film to emerge from the polarization conversion element.

5. The polarization conversion element according to claim 3, wherein the first beam splitting film has a characteristic in which the transmittance for the light of the two wavelength regions with the first polarization direction is higher than 50% and the transmittance for the light of the remaining one wavelength region with the first polarization direction is lower than 50%, and the second beam splitting film has a characteristic in which the transmittance for the light of the two wavelength regions with the first polarization direction is lower than 50% and the transmittance for the light of the remaining one wavelength region with the first polarization direction is higher than 50%, wherein the light of the two wavelength regions with the first polarization direction is transmitted through the first beam splitting film, converted into light with the second polarization direction by the phase plate, and then transmitted through the second beam splitting film to emerge from the polarization conversion element, the light of the two wavelength regions with the second polarization direction is transmitted through the first beam splitting film, converted into light with the first polarization direction by the phase plate, reflected by the second beam splitting film, converted into light with the second polarization direction by the phase plate again, and then transmitted through the first beam splitting film to emerge from the polarization conversion element, the light of the remaining one wavelength region with the first polarization direction is reflected by the first beam splitting film to emerge from the polarization conversion element, and the light of the remaining one wavelength region with the second polarization direction is transmitted through the first beam splitting film, converted into light with the first polarization direction by the phase plate, and then transmitted through the second beam splitting film to emerge from the polarization conversion element.

6. The polarization conversion element according to claim 1, wherein the element includes a reflecting surface which reflects light reflected by the beam splitting film to direct it in a direction of emergence from the element.

7. The polarization conversion element according to claim 1, wherein the element comprises plural polarization conversion cells each including the beam splitting film and the phase plate.

8. An illumination optical system comprising the wavelength-selective polarization conversion element according to claim 1, the polarization conversion element converting non-polarized illumination light including light of the first, second and third wavelength regions into polarized light.

9. The polarization conversion element according to claim 1, further comprising:
a substrate which is integrally formed with the beam splitting film and the phase plate, the substrate being made of glass or acrylic,
wherein the beam splitting film is attached to the substrate, and
wherein the light impinging on the beam splitting film enters the polarization conversion element from the substrate.

10. An image projection apparatus comprising:
a first image-forming element, a second image-forming element and a third image-forming element for light of a first wavelength region, light of a second wavelength region and light of a third wavelength region, respectively;
an illumination optical system which includes a wavelength-selective polarization conversion element and illuminates the first, second and third image-forming elements with light from the polarization conversion element, the polarization conversion element converting non-polarized light including light of the first, second and third wavelength regions emitted from a light source into linearly-polarized light; and
a projection optical system which projects light emerged from the first, second and third image-forming elements,
wherein the polarization conversion element comprising:
a beam splitting film which splits light by transmission and reflection and has a characteristic in which at least its transmittance for light with a first polarization direction changes between a transmittance higher than 50% and a transmittance lower than 50% depending on wavelength regions; and
a phase plate which converts, when transmitting once therethrough the light of the first wavelength region, the light of the second wavelength region and the light of the third wavelength region, the first polarization direction thereof into a second polarization direction orthogonal to the first polarization direction and the second polarization direction thereof into the first polarization direction,
wherein the wavelength-selective polarization conversion element converts light of two of the first, second and third wavelength regions into light with one of the first and second polarization directions and converts light of the remaining one wavelength region into light with the other polarization direction, and
wherein the beam splitting film and the phase plate are formed integrally with each other.

11. The image projection apparatus according to claim 10, wherein the illumination optical system comprises:
a lens array which divides the non-polarized light into plural luminous fluxes;
the wavelength-selective polarization conversion element; and
a condenser lens which collects the luminous fluxes from the wavelength-selective polarization conversion element.

12. An image display system comprising:
the image projection apparatus according to claim 10, and
an image supply apparatus which supplies an image signal to the image projection apparatus.

13. A wavelength-selective polarization conversion element which converts non-polarized light including light of a first wavelength region, light of a second wavelength region and light of a third wavelength region into polarized light, the element comprising in order from a light-entering side:
a first beam splitting film which has a characteristic in which its transmittance for light with a first polarization direction changes between a transmittance higher than 50% and a transmittance lower than 50% depending on wavelength regions;
a phase plate which converts, when transmitting once therethrough the light of the first wavelength region, the light of the second wavelength region and the light of the third wavelength region, the first polarization direction thereof into a second polarization direction orthogonal to the first polarization direction and the second polarization direction thereof into the first polarization direction; and
a second beam splitting film which has a characteristic in which its transmittance for light with a first polarization direction changes between a transmittance higher than 50% and a transmittance lower than 50% depending on wavelength regions,
wherein a wavelength region where the transmittance of the first beam splitting film for the light with the first polarization direction is higher than 50% and a wavelength region where the transmittance of the second beam splitting film for the light with the first polarization direction is higher than 50% are different from each other,
wherein a wavelength region where the transmittance of the first beam splitting film for the light with the first polarization direction is lower than 50% and a wavelength region where the transmittance of the second beam splitting film for the light with the first polarization direction is lower than 50% are different from each other,
wherein the first and second beam splitting films and the phase plate are formed integrally with each other, and
wherein the polarization conversion element converts light of two of the first, second and third wavelength regions into light with one of the first and second polarization directions and converts light of the remaining one wavelength region into light with the other polarization direction.

14. An image projection apparatus comprising:
a first image-forming element, a second image-forming element and a third image-forming element for light of a first wavelength region, light of a second wavelength region and light of a third wavelength region, respectively;
an illumination optical system which includes the wavelength-selective polarization conversion element according to claim 13 and illuminates the first, second and third image-forming elements with light from the polarization conversion element, the polarization conversion element converting non-polarized light including light of the first, second and third wavelength regions emitted from a light source into linearly-polarized light; and
a projection optical system which projects light emerged from the first, second and third image-forming elements.

* * * * *